United States Patent

Migaki et al.

[11] Patent Number: 5,934,601
[45] Date of Patent: Aug. 10, 1999

[54] METHOD FOR CONTROLLING THE DRIVE OF A YARN WINDER, AND THE YARN WINDER THEREOF

[75] Inventors: Yoshiro Migaki; Jun Takagi, both of Otsu; Takashi Iwade, Soraku-gun, all of Japan

[73] Assignee: Toray Engineering Co., Ltd., Osaka, Japan

[21] Appl. No.: 08/868,814

[22] Filed: Jun. 4, 1997

Related U.S. Application Data

[63] Continuation of application No. 08/671,673, Jun. 28, 1996, abandoned, which is a continuation of application No. 08/209,910, Mar. 14, 1994, Pat. No. 5,605,294.

[30] Foreign Application Priority Data

| Mar. 15, 1993 | [JP] | Japan | 5-81398 |
| Mar. 25, 1993 | [JP] | Japan | 5-92200 |
| Nov. 5, 1993 | [JP] | Japan | 5-300896 |
| Nov. 10, 1993 | [JP] | Japan | 5-305776 |

[51] Int. Cl.[6] ............ B65H 54/00; B65H 67/44
[52] U.S. Cl. ............ 242/477; 242/477.5; 242/481
[58] Field of Search ............ 242/18 DD, 18 A, 242/25 A, 18 R, 35.5 T, 474.3, 477, 477.5, 481

[56] References Cited

U.S. PATENT DOCUMENTS

| 1,994,403 | 3/1935 | Reiners et al. | 242/18 |
| 1,994,404 | 3/1935 | Reiners et al. | 242/18 |
| 2,572,904 | 10/1951 | Bauer | 28/38 |
| 3,921,923 | 11/1975 | Kuno et al. | 242/18 A |
| 4,033,519 | 7/1977 | Abe et al. | 242/18 |
| 4,106,710 | 8/1978 | Schnippers et al. | 242/18 R |
| 4,266,152 | 5/1981 | Herr et al. | 310/59 |
| 4,548,366 | 10/1985 | Wirz et al. | 242/18 R |
| 4,552,313 | 11/1985 | Sasaki | 242/18 A |
| 4,613,089 | 9/1986 | Munnekehoff | 242/18 |
| 4,765,552 | 8/1988 | Sugioka et al. | 242/18 A |
| 5,082,191 | 1/1992 | Wirz | 242/18 A |
| 5,234,173 | 8/1993 | Nishikawa et al. | 242/18 |

FOREIGN PATENT DOCUMENTS

| 0 160 954 | 11/1985 | European Pat. Off. . |
| 0 200 234 | 12/1986 | European Pat. Off. . |
| 0 445 944 | 9/1991 | European Pat. Off. . |
| 0 580 548 | 1/1994 | European Pat. Off. . |
| 2 104 203 | 4/1972 | France . |
| 2273746 | 1/1976 | France . |
| 37 18 831 | 12/1988 | Germany . |
| 39 13 793 | 11/1989 | Germany . |
| 41 33 232 | 4/1992 | Germany . |
| 41 26 392 | 12/1992 | Germany . |
| 57-57091 | 4/1982 | Japan . |
| 62170 | 4/1982 | Japan ............ 242/18 R |
| 58-152 763 | 9/1983 | Japan . |
| 58-202261 | 11/1983 | Japan . |
| 58-214032 | 12/1983 | Japan . |
| 60-228362 | 11/1985 | Japan . |

(List continued on next page.)

*Primary Examiner*—William Stryjewski
*Attorney, Agent, or Firm*—Finnegan, Henderson, Farabow, Garrett & Dunner, L.L.P.

[57] ABSTRACT

A yarn winder in which a fluctuation of winding tension is avoided and the winding characteristics are made uniform from the most inner to the most outer layer. Yarn is wound by a winder in which a spindle 2 having a positively driven pressure roller 5 is positively driven, the pressure roller 5 being positioned so that it is not in contact with a tube 100 immediately after the yarn setting operation. After a predetermined amount of yarn layer has been wound on the tube 100, the pressure roller 5 is moved so that it contacts the yarn layer on the tube 100. The surface speed of the pressure roller 5 is controlled to be higher than that of an empty tube until the yarn is switched to the empty tube, wherein the controlled speed is approximately the same as or lower than the surface speed of a fully loaded tube, and the surface speed of the pressure roller is controlled to be approximately the same as the surface speed of the empty tube after the yarn has been switched to the empty tube.

5 Claims, 25 Drawing Sheets

FOREIGN PATENT DOCUMENTS

| | | |
|---|---|---|
| 60-258070 | 12/1985 | Japan . |
| 2677 | 1/1986 | Japan ................................. 242/18 R |
| 62-264172 | 11/1987 | Japan . |
| 62-280171 | 12/1987 | Japan . |
| 1-57029 | 2/1988 | Japan . |
| 63-160977 | 7/1988 | Japan . |
| 1-035112 | 2/1989 | Japan . |
| 1-192671 | 8/1989 | Japan . |
| 5-12454 | 1/1993 | Japan . |
| 58-224970 | 12/1993 | Japan . |
| 6-191723 | 7/1994 | Japan ................................. 242/18 R |
| 1441821 | 7/1976 | United Kingdom . |

METHOD FOR CONTROLLING THE DRIVE OF A YARN WINDER, AND THE YARN WINDER THEREOF

This is a continuation of application Ser. No. 08/671,673 filed Jun. 28, 1996; which is a continuation of application Ser. No. 08/209,910 filed Mar. 14, 1994.

BACKGROUND OF THE INVENTION

1. Field of the Invention

The present invention relates to a yarn winder which winds a yarn at a speed not less than 4000 m/min, and more particularly relates to a controlling system for driving the yarn which can wind the yarn at high speed.

2. Description of the Related Art

In general, when a yarn is wound after it has been spun out from a spinning machine, a winder is used which includes: a spindle to which a tube is attached, wherein the spindle is rotatably mounted on a machine frame; a traverse unit disposed at an upper position of the spindle, wherein the traverse unit can be elevated in a vertical direction with respect to the machine frame; and a pressure roller coming into contact with a tube attached to the spindle so that a predetermined surface pressure can be given to the tube.

In the case where the winding speed is not less than 6000 m/min, the spindle and pressure roller are positively rotated by a drive unit for preventing the tube surface from being damaged when it is rubbed by the pressure roller, and also even in the case where the winding speed is 4000 m/min to 6000 m/min, the spindle and pressure roller are positively rotated for improving a package configuration.

When the spindle rotating at the high speed described above is switched from a fully loaded tube to an empty tube, the speed of the fully loaded tube is slightly increased and the winding tension is increased so that the yarn can be more strongly wound in yarn catching grooves formed on the tube, and so that the yarn tension can be stabilized for preventing the yarn from being wound around a godet roller disposed on the upstream side of the winder.

However, in the case where the pressure roller is driven at a predetermined speed, a yarn on the upstream side of the winder is wound by the fully loaded tube after it has come into contact with the pressure roller. Therefore, when an increase of the speed of the fully loaded tube is small, tension of the yarn on the upstream side of the winder is not increased, so that the yarn is wound around the godet roller due to a decrease of tension when the yarn is switched. In this way, the yarn switching operation fails. When the increase of the speed of the fully loaded tube is large, tension applied between the pressure roller and the fully loaded tube is greatly increased, so that the yarn is torn off when it comes into contact with the tube. In this way, the yarn switching operation also fails. Further, a problem is caused in which the yarn tension fluctuates in the case where the yarn is switched so that the characteristics of the yarn wound in the most outside layer are changed.

In an ordinary yarn taking up operation, and yarn switching operation, including the yarn which is spun from a nozzle of a yarn spinning machine, is directly wound on an empty tube rotated at a high speed, at time when the yarn is first set on the tube or when the yarn is first switched, the thickness of a yarn layer wound around the tube is very small. Therefore, when the pressure roller comes into contact with the yarn layer on the tube under the above condition, the yarn layer is beaten and damaged by the pressure roller, which causes weaving specks in a weaving process and dyeing specks in a dyeing process.

In order to prevent the occurrence of the above problems in which the yarn layer is beaten and damaged by the pressure roller when the pressure roller comes into contact with the yarn layer on the tube under the condition that the yarn layer on the tube is very thin, the pressure roller is provided with a step portion, and a pacer is provided at an end portion of a sliding shaft supporting the pressure roller so that a gap can be formed between the pressure roller and the tube.

Further, the pressure roller described above is positively rotated by a drive unit, so that the pressure roller is not contacted with the yarn layer when the yarn is set on the drum or when the yarn is switch or immediately after the switch of the yarn. For this reason, it is impossible to control the rotational speed of the spindle to which the tube is attached, in accordance with the rotational speed of the pressure roller.

Therefore, until the pressure roller comes into contact with the yarn layer, the spindle speed is controlled by forward control based on the calculation of a diameter of the yarn layer wound around the tube utilizing a conventional manner. This forward control is switched to feedback control in the following manner: When a yarn layer of predetermined thickness is formed on the tube, the yarn layer comes into contact with the pressure roller so that the rotational speed (number of revolution) of the spindle is changed. Then the change in speed is detected, and the rotational speed control of the spindle is switched to feedback control in which the rotational speed of the spindle is controlled to a predetermined winding speed in accordance with the rotational speed of the pressure roller.

According to a method in which the pressure roller is supported at a predetermined position and the yarn layer comes into contact with the pressure roller when a diameter of the yarn layer is increased as the yarn is wound around the tube, as illustrated in FIG. 17, it takes a very long period of time from a point of time (T1) when the yarn layer is formed on the tube and the yarn layer on the tube starts coming into contact with the pressure roller, to a point of time (T3) when the surface pressure is increased to a predetermined surface pressure (Pa).

Even when the yarn layer comes into contact with the pressure roller, the surface pressure varies according to the type, size and layer thickness of the yarn, and further the rotational condition of the pressure roller also varies.

For this reason, it is impossible to accurately detect the time at which feed forward control is switched to feedback control, and further the following problems are caused:

Even when the surface pressure is not increased to the setting surface pressure (Pa), feed forward control is switched to feedback control. Even after the surface pressure has increased to the predetermined surface pressure (Pa), feed forward control can not be switched to feedback control. In this way, speed control can not be conducted accurately, so that a difference is produced between the surface speeds of the yarn layer and the pressure roller. Accordingly, the yarn layer is affected.

In this case, the pressure roller is driven by an electric motor controlled by open loop control so that the rotational speed of the pressure roller can become a value corresponding to the setting speed.

When the spindle provided with a tube is rotated by the electric motor and the pressure roller comes into contact with the tube, winding of the yarn starts. Then the rotational speed of the pressure roller is detected, and the electric motor for driving the spindle is subjected to feedback control so that the pressure roller speed can be a predetermined value.

There is a slippage in the rotation of the electric motor itself, and further there is a rotational resistance in the rotation of the bearing portion of the electric motor, and also there is a rotational resistance in the rotation of the bearing portion of the roller. Accordingly, when the drive of the electric motor is controlled without giving consideration to the slippage, the virtual rotational speed of the pressure roller is lowered with respect to the directed rotational speed of the electric motor. As a result, the pressure roller is driven by the spindle, so that an extra load is applied to a package, which deteriorates the configuration of the package.

Different from the above case, in a turret type winder in which the electric motor for driving the pressure roller is subjected to open loop control, when the pressure roller is not contacted with the package in the case where the yarn is switched, the rotational speed of the pressure roller is not corrected even if the virtual rotational speed of the pressure roller is lowered with respect to the directed rotational speed. Consequently, the yarn winding tension is lowered.

When the yarn is switched from a fully loaded package to an empty package under the above condition, the yarn is wound around the rollers arranged on the upstream side of the winder, so that the success ratio of switching a yarn is lowered.

In order to solve the above problems, a slippage caused in the electric motor for driving the pressure roller is measured after the completion of assembly of the winder in the manufacturing process, and the measured slippage is converted into a correction coefficient, which is manually inputted into the control unit so as to be stored.

Further, the following winder is used when a yarn is wound after it has been spun out from a spinning machine. The winder includes: a spindle rotatably attached to a machine frame, the spindle holding a plurality of tubes; a pressure roller coming into contact with a yarn layer wound around the tube held by the spindle; a traverse unit disposed on an upstream side of the pressure roller; a frame body to which the pressure roller is rotatably attached and also the traverse unit is integrally attached, the frame body being supported by two guides provided in the machine frame in a cantilever condition so that the frame body can be vertically elevated; and a hydraulic cylinder supporting a portion of the frame body close to the cantilever portion. The winder having the above construction is disclosed in the official gazette of Japanese Utility Model Publication No. 57-57091.

Recently, in order to improve the winding capacity, the spindle length is increased so that the number of tubes to be held by the spindle can be increased (the number is increased to 4 to 8). When the spindle length is increased, the length of a pressure roller and that of a traverse unit are naturally increased.

However, a frame body to which the pressure roller and the traverse unit are attached is supported in a cantilever condition by two guides provided in the machine frame.

Therefore, as illustrated in FIG. 18, when the length from a gravity center (G) of the frame body 71 to the hydraulic cylinder 74 is L1, and the weight of the frame body 71 and the pressure roller is W, the moment (W×L1) is applied to the sliding ball bearing 73 by which the frame body 71 is slidably provided to the guide 72. For example, when the weight (W) of the frame body 71 and others is 200 Kg, and the length (L1) from the gravity center (G) of the frame body 71 to the hydraulic cylinder 74 is 90 cm, the moment of 18000 Kg·cm is applied to the sliding ball bearing 73.

When the large moment described above is applied to the sliding ball bearing 73, the running resistance of the sliding ball bearing 73 is increased, and the surface pressure of a pressure roller (not shown) can not be correctly controlled, so that the configuration of a package is deteriorated.

In order to allow it to receive such a high moment, the diameter and length of the sliding ball bearing 73 are greatly increased. Therefore, the height of the frame body 71 on which the sliding ball bearing is mounted must be increased, so that the overall length of the winder is increased.

In this connection, when a yarn is wound by the winder described above, since the spindle is mounted on the same machine frame as that of the frame body, vibration is transmitted to the frame body through the machine frame when the spindle is rotated. Further, since the pressure roller is contacted with the tube held by the spindle with a predetermined surface pressure, vibration of the spindle is transmitted to the frame body through the pressure roller.

Therefore, when the frequency of vibration caused by the rotation of the spindle winding a yarn coincides with the natural frequency of the frame body, the frame body resonates, so that the vibration is increased, which causes the collapse of the yarn layer of the package.

In the case where the winding operation is not conducted by the above winder, it is necessary to fix the pressure roller to the machine frame so that the pressure roller can not come into contact with the tube held by the spindle under the condition that hydraulic fluid is not supplied to a hydraulic cylinder. Therefore, as illustrated in FIG. 18, a stopper means 75 is provided at a position of the fore end of the frame body 71, wherein the position is located closer to the fore end than the cantilever supporting portion of the frame body 71.

The stopper means 75 is rotatably mounted on the machine frame 70, and composed of an engaging claw member 76 rotated by a hydraulic cylinder 77, and an engaging piece 78 integrally attached to the frame body 71. When the engaging piece 78 is hooked at the engaging claw member 76, the frame body 71 is supported so that it can not be lowered.

Therefore, in the same manner as that of a case in which the frame body 71 is supported by the hydraulic cylinder 74, when the length from the gravity center (G) of the frame body 71 to the hook position (G1) of the stopper means 75 is L1, and the length from the hook position (G1) of the stopper means 75 to the center of the guide 72 is L3, and the weight of the frame body 71 is W, the same moment (W×L1) as that applied to the sliding ball bearing 73 when the frame body 71 is supported by the hydraulic cylinder 74, is applied to the sliding ball bearing 73.

Therefore, a sliding ball bearing 73, the allowable moment of which is high, must be used for this device, so that the size of the frame body 71 is increased in the height direction in the same manner as that of the case described above. Accordingly, an overall height of the winder is increased.

In this connection, Japanese Unexamined Utility Model Publication No. 5-12454 discloses a construction in which guides are provided on both sides of the frame body, and the frame body is elevated along the two guides while both sides of the frame body are supported by the guides.

However, in order to elevate the long frame body in parallel with respect to the spindle while both ends of the frame body are supported by the guides, it is necessary to accurately machine the frame body and guides, and further predetermined rigidity is required for the frame body and guides.

Further, in order to maintain the pressure roller and spindle parallel with each other without being affected by the condition of the floor on which the winder is installed, it is necessary to increase the sizes of the machine frame, guides and frame body.

In this connection, the construction of a drive type pressure roller is shown in FIG. 19, in which the pressure roller is positively rotated. The drive type pressure roller is constructed in the following manner: One shaft portion 81b of the roller 81 is rotatably provided in the frame body 95 for mounting the traverse head, through the bearing section 82. The other shaft portion 81c is rotatably supported by the bearing section 87, and connected with the electric motor 89 through the coupling 88. The bearing section 82 is composed of the bearing 83 rotatably supporting the shaft portion 81b of the roller 81, and also composed of the bracket 84 which is a supporting member of the bearing 83. The bearing section 85 is composed of the bearing 86 rotatably supporting the shaft portion 81c, and also composed for the bracket 87 which is a supporting member of the bearing 86.

Alternatively, the construction of a drive type pressure roller is shown in FIG. 20, in which the drive type pressure roller is constructed in the following manner: Both shaft portions 81b, 81c of the roller 81 are rotatably supported by the frame body 95 through the bearing 82. One shaft portion 81c is provided with the timing pulley 90, and the output shaft of the electric motor 89 mounted on the frame body is provided with the timing pulley 91. The timing belt 92 is provided between the timing pulleys 90, 91. Rotation is transmitted to the roller 81 through the timing pulleys 90, 91 and the timing belt 92.

In the former case in which the electric motor is connected with the roller through the coupling, the size of the pressure roller mechanism of the longitudinal direction is increased. In the latter case in which the roller and the electric motor are disposed in parallel, the size of the pressure roller mechanism of the transverse direction is increased, and also the size of the height direction is increased, so that the overall size of the winder is increased.

Further, the number of bearings is increased to a value of not less than 4. Accordingly, when the winding operation is conducted at high speed of not less than 4000 m/min, energy loss is remarkably increased, and at the same time an amount of heat generated by the electric motor is increased, so that the lubricant of bearings assembled to the electric motor is quickly deteriorated, and the bearing life is extremely reduced. Further, in the high speed winding operation, the winding speed of which is 7000 m/min, the heat generated by the motor and bearing is transmitted to the roller body, so that the temperature of the roller rises higher than the setting temperature. As a result, the characteristics of a yarn coming into contact with the roller body are changed, and dyeing specks are caused in the latter process.

Next, an idle type pressure roller 80 rotated by a package is shown in FIG. 21, in which the shaft portions 81b are protruded onto both sides of the roller body 81a, and this roller 81 is rotatably mounted on the frame body 13 through the bearing 82.

In the case where the pressure roller 80 is of the idle type, in the same manner as that of the drive type, when a yarn is wound at a high speed of not less than 4000 m/min, the bearing 83 of the bearing section 82 is heated when the roller 81 is rotated at high speed by the tube or package tightly attached to the spindle 2. Therefore, the bracket 84 coming into contact with an outer race portion of the bearing 83 is heated, and at the same time the shaft portion 81b coming into contact with an inner race portion of the bearing 83 is also heated, so that the temperature of end portions of the roller body 81a close to the shaft portion 81b is raised. However, since the bearing section is not forcibly cooled, the amount of heat radiated from the bearing 83 is larger than that radiated from the peripheral surface of the bracket 84. As a result, the lubricator in the bearing is quickly deteriorated, and the life of the bearing 83 is reduced.

When the heat generated by the shaft portion 81b is only radiated from the peripheral surface of the end portion of the roller body 81a, the temperature of the roller can not be immediately lowered, and further the heat in the end portion of the roller body 81a is not transmitted to the center of the roller body 81a. Accordingly, the temperature of the end portion of the roller body 81a becomes higher than the temperature of the center. For this reason, the characteristics of the yarn coming into contact with the portion of the roller, the temperature of which is high, are changed. As a result, dyeing and weaving specks are caused in the process to which the yarn is subjected later.

In the present invention, the first problem to be solved, is described as follows:

When the yarn is subjected to the switching operation, tension applied to the yarn fluctuates. Therefore, the yarn is torn off and the yarn switching operation fails, and further a package having uniform characteristics from the most inner to the most outer layer can not be provided.

The second problem is described as follows:

It takes a long period of time from when the yarn layer provided on the tube comes into contact with the pressure roller, to when the surface pressure is increased to a predetermined value. Further, it is impossible to accurately detect the time at which feed forward control is switched to feedback control.

The third problem is described as follows: The slippage characteristics of an electric motor and the rotational resistance of a bearing are different between the individual devices. Therefore, it is necessary to measure the slippage and to input a correction coefficient for each winder. Accordingly, it takes much time and labor. Since the correction coefficient is stored in a control unit, the correction coefficient must be inputted again each time a combination of the winder and control unit is changed.

The fourth problem is described as follows:

There is a difference between the temperature of the bearing at an initial stage immediately after the start of the operation, and the temperature of the bearing after it has operated over a long period of time. Therefore, the rotational resistance differs, and the slippage of the electric motor is greatly changed. Further, when the rotational resistance of the bearing is changed with age, the slippage of the electric motor is also changed. Accordingly, a difference is caused between the previously measured and inputted slippage, and the substantial slippage. Therefore, the rotational speed of the pressure roller is lowered, and the pressure roller is rotated by a package. As a result, a package of uniform configuration can not be provided.

The fifth problem is described as follows: When the rotational speed of the pressure roller is increased, the pressure roller drives the package, so that the electric motor is heated and may be damaged by an overload.

The sixth problem is described as follows: In a turret type winder, yarn winding tension fluctuates in the yarn switching operation. Therefore, the yarn is torn off or wound around other rollers, and a ratio of success is lowered in the yarn switching operation.

The seventh problem is described as follows: Since the frame body is supported in a cantilever condition, a high moment is applied to the sliding ball bearing, so that the running resistance of the sliding ball bearing is increased and the surface pressure of the pressure roller cannot be accurately controlled, which deteriorates the configuration of a package.

The eighth problem is described as follows: When the frequency of vibration caused by the rotation of the spindle in the yarn winding operation coincides with the natural frequency of the frame body, resonance is caused in the winder, and the yarn layers of the package collapse.

The ninth problem is described as follows: When the frame body is supported by the stopper means, a high moment is applied to the sliding ball bearing, so that a sliding bearing of high allowable moment must be used. As a result, an overall height of the winder is increased.

The tenth problem is described as follows: In a construction in which the drive electric motor is connected with the roller through a coupling, the size of the pressure roller mechanism of the longitudinal direction is increased. In the case where the roller and drive electric motor are provided in parallel, the size of the pressure roller mechanism of the transverse direction or the size of the height direction is increased. As a result, the overall size of the winder is increased.

The eleventh problem is described as follows. The number of bearings is increased to a value of not less than 4. Accordingly, when the spindle is rotated at a high speed of not less than 4000 m/min, energy loss is increased, and at the same time an amount of heat generated by the electric motor is generated. Therefore, the lubricant in the bearings in the electric motor is quickly deteriorated, so that the life of the bearing is extremely reduced.

The twelfth problem is described as follows:

In the high speed winding operation in which a yarn is wound at a speed of 7000 m/sec, the heat generated by the electric motor and bearings is transmitted to the roller body. Therefore, the temperature is raised to a value higher than the setting temperature. Accordingly, the characteristics of a yarn coming into contact with the roller body are changed, which causes dyeing and weaving specks in the later process.

SUMMARY OF THE INVENTION

The object of the present invention is to provide means for resolving the above-mentioned problems which are seemed to be drawbacks in conventional technologies.

In order to solve the first and second problems, according to a first aspect of the present invention, there is provided a yarn winder having a controlling means for controlling the drive of a yarn winder. In the winder, when a yarn switching operation is carried out so that a yarn is directly wound on an empty tube, rotated by a spindle drive type winder having a positively driven pressure roller or a yarn is wound on an empty tube from a fully loaded tube, i.e., a tube on which yarn is fully wound thereon. And said controlling means is further provided with a positioning means for positioning the pressure roller so that the pressure roller is not contacted with a tube immediately after the yarn switching operation when the yarn is switched to the empty tube; moving means for moving at least one of the pressure roller and the tube in a direction so that a distance between the pressure roller and the tube is reduced after a predetermined amount of yarn layer has been formed on the tube to thereby permit the pressure roller to come into contact with the yarn layer provided on the tube at a predetermined surface pressure; and means for controlling the surface speed of the pressure roller to be higher than that of the empty tube until the yarn is switched to the empty tube side.

Further, in the present invention, when the yarn is switched from the yarn-full-loaded tube to an empty tube, the yarn winder is further provided with additional means for controlling the surface speed of the pressure roller so that the controlled speed of the pressure roller is approximately the same as or lower than the surface speed of the fully loaded the tube and after when the yarn is switched from the yarn-fully-loaded tube to the empty tube, the surface speed of the pressure roller is controlled so as to be approximately the same as the surface speed of the empty tube.

According to a second aspect of the present invention, the present invention is to provide a means for controlling the drive of a yarn winder in which a yarn is wound by a spindle drive type winder having a positively driven pressure roller, said method comprising the steps of; positioning the pressure roller so that the pressure roller is not contacted with a tube immediately after the yarn setting operation or yarn switching operation; moving at least one of the pressure roller and the tube in a direction so that a distance between the pressure roller and the tube is reduced after a predetermined amount of yarn layer has been formed on the tube; permitting the pressure roller to come into contact with the yarn layer provided on the tube at a predetermined surface pressure; and switching the rotational speed control of the spindle from feed forward control based on the calculation of winding diameter obtained by a conventional calculation method, to feedback control by which the rotational speed of the spindle is controlled to a predetermined winding speed based on the rotational speed of the pressure roller when the pressure roller comes into contact with the yarn layer formed on the tube.

In order to solve the third to sixth problems, according to a third aspect of the present invention, the present invention is to provide a means for controlling the drive of the pressure roller of a yarn winder in which a yarn is wound by a spindle drive type winder having an electric motor for driving the pressure roller, comprising the steps of: rotating the pressure roller by the electric motor at the yarn setting operation or yarn switching operation under the condition that the pressure roller is not contacted with a tube tightly attached to the spindle; calculating a slippage caused in the electric motor; and correcting a command frequency given to the electric motor so as to command the rotation of the electric motor in accordance with the slippage.

Also, according to a fourth aspect of the present invention, the present invention is to provide a means for controlling the drive of the pressure roller of a yarn winder, further comprising the step of calculating the slippage caused in the electric motor for driving the pressure roller by the number of pressure roller rotation detecting pulses or the number of detected rotation when the pressure roller is rotated by the electric motor at a predetermined rotational speed, and also calculated by the number of pulses or the number of rotation found while the slippage of the electric motor is neglected. Alternatively, according to a fifth aspect of the present invention, the present invention is to provide a means for controlling the drive of the pressure roller of a yarn winder, further comprising the step of calculating the slippage caused in the electric motor for driving the pressure roller by a command frequency at the time when the pressure roller is rotated by the electric motor at a predetermined speed, and also calculating by a frequency found while the slippage is neglected.

In order to solve the seventh problem, according to a sixth aspect of the present invention, the present invention is to provide a yarn winder comprising: hydraulic cylinders provided at both end portions of the frame body, wherein both end portions of the frame body are supported by the two hydraulic cylinders.

According to a seventh aspect of the present invention, it is preferable to adopt the construction in which the inner diameters of the two hydraulic cylinders are different.

In order to solve the eighth problem, according to an eighth aspect of the present invention, the present invention is to provide a yarn winder, in which a hydraulic fluid supply pipe is connected to each hydraulic cylinder, and a control unit is provided and a pipe line of the hydraulic fluid supply pipe is changed or hydraulic pressure of the supplied fluid is controlled in accordance with a signal sent from the control unit.

In order to solve the ninth problem, according to a ninth aspect of the present invention, the present invention is to provide a yarn winder, comprising a stopper means for fixing the frame body to the machine frame so that the pressure roller is not contacted with the tubes held by the spindle, the stopper means including a stopper member provided on the machine frame side and an engaging member provided in the frame body, wherein a contact surface of the stopper and engaging members is inclined by and angle of 0° to 45° so that a lower tangential line of the contact surface is inclined toward the cantilever supporting side of a movable frame body.

In order to solve the tenth problem, according to a tenth aspect of the present invention, the pressure roller of the yarn winder comprises an electric motor provided at one end portion of the pressure roller, wherein a shaft of the pressure roller and an output shaft of the electric motor are commonly used. According to an eleventh aspect of the present invention, the pressure roller of the yarn winder comprises electric motors provided at both end portions of the pressure roller, wherein a shaft of the pressure roller and an output shaft of the electric motor are commonly used.

In order to solve the eleventh and twelfth problems, according to a twelfth aspect of the present invention, the present invention is to provide a pressure roller of the yarn winder comprising an electric motor provided at one end portion of the pressure roller, wherein a shaft of the pressure roller and an output shaft of the electric motor are commonly used, and a heat conductive member is inserted into a housing portion of the electric motor in such a manner that the heat conductive member is protruded onto the opposite side to the pressure roller and a cooling member is attached to the protruding portion of the heat conductive member. According to other embodiment of this aspect, the present invention is to provide a pressure roller of the yarn winder in which the heat conductive member is inserted into a core portion of the pressure roller in the longitudinal direction of the core including at least the housing portion of the electric motor. According to another embodiment of this aspect, the present invention is to provide a pressure roller of the yarn winder in which the pressure roller is rotatably attached to a supporting member through a bearing, and a heat conductive member is inserted into the pressure roller in the longitudinal direction of the core of the pressure roller including at least bearing portions provided at both ends.

DETAILED DESCRIPTION OF THE PREFERRED EMBODIMENTS

A specific embodiment of the yarn winder of the present invention will be explained with reference to the attached figures, hereunder.

Figure 1:
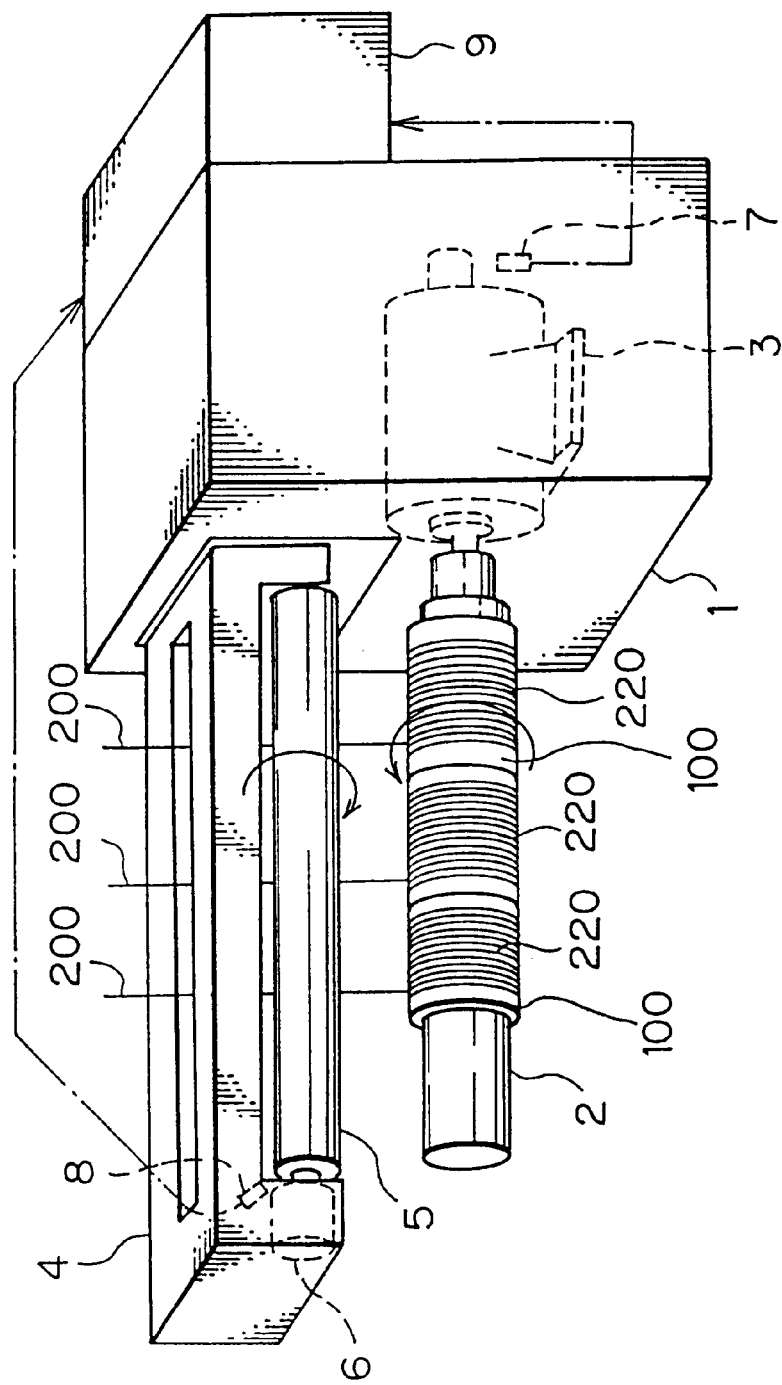
FIG. 1 is a perspective view showing an example of an overall arrangement of the spindle drive type winder for realizing the method for controlling the drive of a yarn winder of the present invention.

FIG. 1 shows a schematic view of a construction of one specific embodiment of the yarn winder concerning the present invention and also shows a drive controlling means to realize the controlling method for controlling the driving system of the yarn winder of the present invention.

Note that, FIG. 1 shows one embodiment of the yarn winder of the present invention. And the yarn winder in which a yarn 200 is wound on a tube 100 fixedly coupled with a spindle 2 provided in a spindle drive type winder having a positively driven pressure roller 5, wherein, immediately after when a yarn 200 is taken up on an rotating tube 100 at a period of a yarn switching operation, the pressure roller 5 is arranged to be set at a position so as to be separated from a surface of said tube 100 with a predetermined distance L interposed therebetween whereby not to contact with a tube 100 and after when a predetermined amount of yarn layer has been formed on the tube 100, at least one of the pressure roller 5 and the tube 100 is moved in a direction so that said predetermined distance L formed between the pressure roller 5 and the tube 100, is reduced, and thereafter said pressure roller 5 is permitted to come into contact with a surface of the yarn layer 220 provided on the tube 100 at a predetermined surface pressure.

In the above-mentioned yarn winder, the yarn switching operation includes a case in which the yarn 200 supplied from a yarn supply means is directly wound on an empty yarn tube 100 and a case in which the yarn 200, supplied from a yarn supply means and already wound on the tube to form a fully loaded tube 215, is switched from the fully loaded tube 215 to an empty tube 100.

The detailed explanation concerning the yarn winder of the present invention which has the above-mentioned basic technical features, will be explained with reference to FIGS. 1 to 3, hereunder.

FIG. 1 is a perspective view showing an example of an overall arrangement of the spindle drive type winder for realizing the method for controlling the drive of a yarn winder of the present invention. The winder includes: an electric motor 3 for driving; a spindle 2 for tightening a tube, rotatably provided in a machine frame 1; a traverse unit 4 provided at an upper position of the spindle 2, wherein the traverse unit 4 is vertically elevated along a guide (not shown) formed in the machine frame 1; and an electric motor 6 for driving. The winder further includes: a pressure roller 5 rotatably provided in the traverse unit 4; a first detector 7 for detecting the rotational speed of the spindle, provided at the rear of the electric motor 3; a second detector 8 for detecting the rotational speed of the pressure roller, provided close to an output shaft of the electric motor 6; and a control unit 9 for controlling the rotational speed of each electric motor.

The first and second detectors 7, 8 described above use a pulse pickup of the optical, magnetic and proximity types.

The control unit 9 uses a microcomputer having the functions of inputting, storing, comparative calculation and operation command.

The traverse unit 4 includes: a slider 12 engaged with a guide 1a formed in the machine frame 1, the slider 12 being elevated in a vertical direction; a frame body 13 disposed in an upper position of the spindle 2, being attached to the slider 12 in parallel with the spindle 2; and a drive mechanism (not shown) of traverse units 14-1, 14-2 attached to the frame body 13 so that a predetermined interval can be provided in the same direction as the longitudinal direction of the spindle 2.

The traverse units 14-1, 14-2 described above are constructed in the following manner: A plurality of impellers are mounted on a plurality of rotational shafts, and the impellers are rotated together with the rotational shafts, so that a reciprocating motion can be given to a yarn.

Alternatively, the traverse units 14-1, 14-2 described above are constructed in the following manner: A traverse guide is engaged with a groove formed on the peripheral surface of a rotational roller, and the traverse guide is reciprocated in the longitudinal direction of the axis of the spindle 2, so that the yarn can be traversed.

Figure 2:
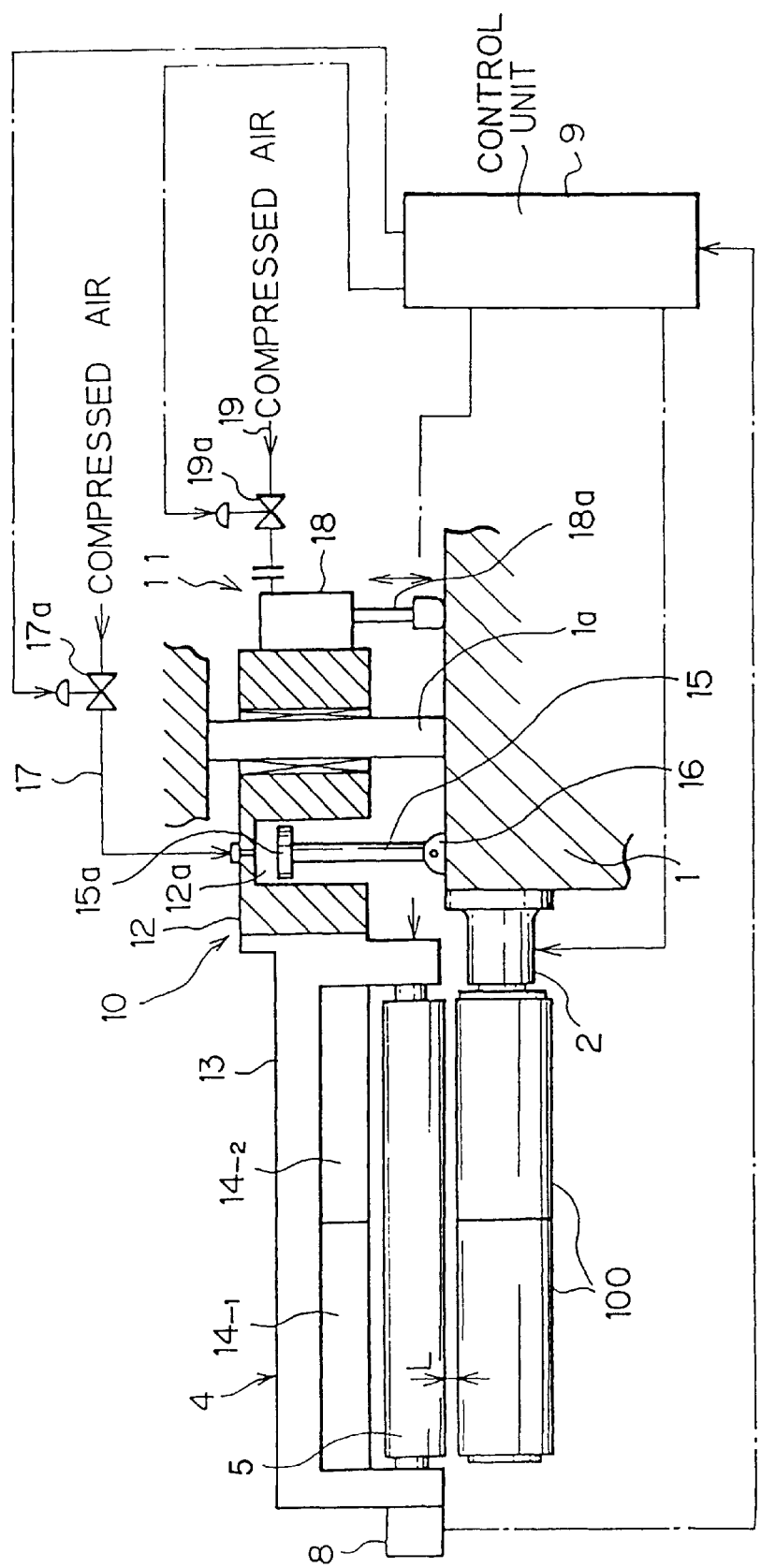
FIG. 2 is a schematic illustration showing an example of the construction of the supporting portion of the traverse unit shown in FIG. 1.
Figure 3:
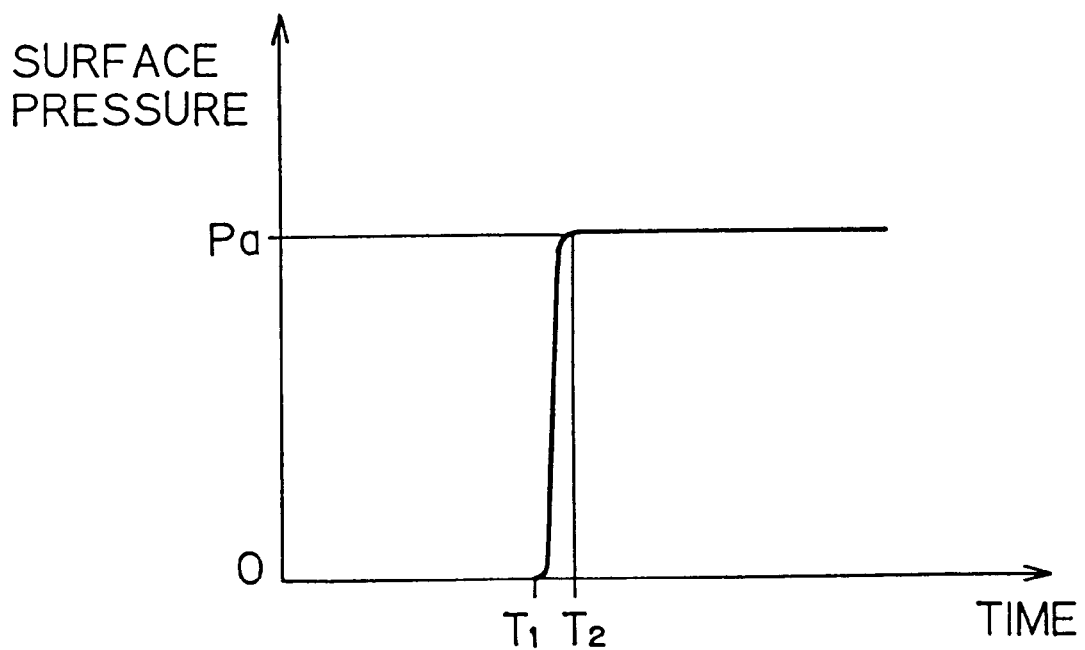
FIG. 3 is a schematic illustration showing a condition of the surface pressure applied when the pressure roller of the winder of the present invention is contacted with the yarn layer provided on the tube.

The aforementioned surface pressure giving mechanism 10 includes as shown in FIG. 2: a piston 15, the head 15a of which is movably inserted into an air chamber 12a formed in the slider 12 so as to move along a longitudinal direction of the chamber 12a, the lower end of which is fixed to the machine frame 1 through a bracket 16; an electromagnetic changeover valve 17a; a pressure regulating valve (not shown); and a fluid supply pipe 17 for supplying hydraulic fluid such as compressed air, connected with the air chamber 12a of the slider 12.

Instead of the above cylinder mechanism of the slider 12 composed of the air chamber 12 and piston 15, a hydraulic cylinder or a pneumatic cylinder available in the market may be used. In this respect, the term "hydraulic" is used herein in a generic sense to mean cylinders actuated by fluids including not only liquid actuating fluids, as implied by hydraulic, but also gaseous actuating fluids such as compressed air.

When fluid of high pressure is supplied to the air chamber 12a, the pressure roller 5 attached to the frame body 13 is raised together with the slider 12, so that the surface pressure impressed upon the spindle 2 is reduced, and when fluid of low pressure is supplied to the air chamber 12a, the surface pressure is increased.

The above support mechanism 11 is composed of a hydraulic cylinder 18 attached to the slider 12, and a fluid supply pipe 19 having an electromagnetic changeover valve 19a.

In the yarn setting operation, or in the yarn switching operation, hydraulic fluid is supplied to the hydraulic cylinder 18, so that the piston rod 18a is protruded and the frame body 13 is raised together with the slider 12. In this way, a predetermined gap is formed between the pressure roller and the tube 100 mounted on the spindle 2. When the yarn setting operation or the yarn switching operation is completed, a timer or a winding diameter detecting sensor detects that a predetermined amount of yarn layer 220 has been formed around the tube 100, and then a fluid supply stop signal is sent from the control unit 9 to the fluid supply pipe 19 of the support mechanism 11 for the tube 100. Then the piston rod 18a of the hydraulic cylinder 18 is withdrawn and the pressure roller 5 comes into contact with the yarn layer formed on the tube 100. Simultaneously when the operation signal is sent to the fluid supply pipe 19, or after a predetermined period of time has passed, the rotational speed control of the spindle 2 is switched from feed forward control to feedback control in which the rotational speed of the spindle 2 is controlled in accordance with the rotational speed of the pressure roller so that the rotational speed of the spindle 2 can be a predetermined winding speed.

A rotary encoder or a pulse detector to detect teeth or holes with a change in light, magnetic force or electrostatic capacity, may be used for the first detector 7 for detecting the rotational speed of the electric motor 3, and for the second detector 8 for detecting the rotational speed of the pressure roller 5.

It is not necessary to provide a step portion onto the pressure roller 5 for preventing the yarn layer 220 formed on the tube 100 from coming into contact with the pressure roller 5.

The drive control operation of the above winder will be explained as follows.

First, the yarn winding speed, traverse speed, number of traverse, winding surface pressure, yarn winding amount, and yarn layer forming time are inputted into the control unit 9.

Next, the electromagnetic changeover valve 19a of the fluid supply pipe 19 is operated, so that the pipe line is changed over and fluid at a predetermined pressure is supplied to the hydraulic cylinder 18. Then the piston rod 18a is protruded, and the frame body 13 is raised together with the slider 12, and a predetermined gap L is formed between the pressure roller 5 and the tube 100 attached to the spindle 2.

When fluid of a predetermined pressure is supplied from the fluid supply pipe 17 to the air chamber 12a of the slider 12, the pressure roller 5 can be contacted with the tube 100 attached to the spindle 2 with a predetermined surface pressure.

After these preparations have been made, the rotational speed of the spindle 2 and that of the pressure roller 5 are controlled to a predetermined yarn winding speed in accordance with the speed command signal sent from the control unit 9. Then a yarn 200 is wound around the tube 100 attached to the spindle 2 by the action of a yarn setting mechanism (not shown), so that a yarn layer 220 (the winding thickness: 0.1 to 0.4 mm) is formed. Simultaneously when the yarn is wound around the tube 100, the winding diameter calculating means (not shown) provided in the control unit 9 is operated, and the winding diameter is calculated by a predetermined winding condition and the rotational speed of the spindle 2. When the winding diameter is increased to a predetermined value, a pipe line switching operation signal is sent from the control unit 9 to the electromagnetic changeover valve 19a of the fluid supply pipe 19 in the support mechanism 11. Therefore, the pipe line is switched, and the supply of fluid to the hydraulic cylinder 18 is stopped.

Then the piston rod 18a of the hydraulic cylinder 18 is withdrawn, the frame body 13 is lowered together with the slider 12, and the pressure roller 5 comes into contact with the yarn layer formed on the tube 100. As illustrated in FIG. 3, a period of time from when the pressure roller 5 starts coming into contact with the yarn layer on the tube 100 (T1), to when the pressure surface is increased to a predetermined value Pa (T2), is very short.

Simultaneously when the operation signal is sent to the fluid supply pipe 19 of the support mechanism 11, or after a predetermined period of time has passed, the rotational speed control of the spindle 2 is switched by the control unit 9 from feed forward control in which control is conducted in accordance with the winding diameter calculation, to feedback control in which the rotational speed of the spindle 2 is controlled in accordance with the rotational speed of the pressure roller 5 so that the rotational speed of the spindle 2 can become a predetermined winding speed.

Then the rotational speed of the pressure roller 5 detected by the second detector 8 is sent to the control unit 9, and the rotational speed of the spindle 2 is subjected to feedback control so that it can be a predetermined winding speed.

As described above, simultaneously when the yarn setting operation has been completed, the winding diameter calculating means (not shown) is operated and the amount of formed yarn layer is calculated. When the calculated value becomes a predetermined one, the hydraulic cylinder of the support mechanism 11 is operated so that the pressure roller 5 can be forcibly contacted with the yarn layer formed on the tube 100, and at the same time the rotational speed control of the spindle 2 is switched from forward control to feed back control. Therefore, the rotational speed control of the spindle 2 can be switched at a constant timed relation. At the same time, the rotational speed control of the spindle 2 is switched under the condition that the pressure roller 5 is contacted with the yarn layer on the tube 100 with a predetermined surface pressure. Accordingly, speed control can be accurately performed.

Figure 5:
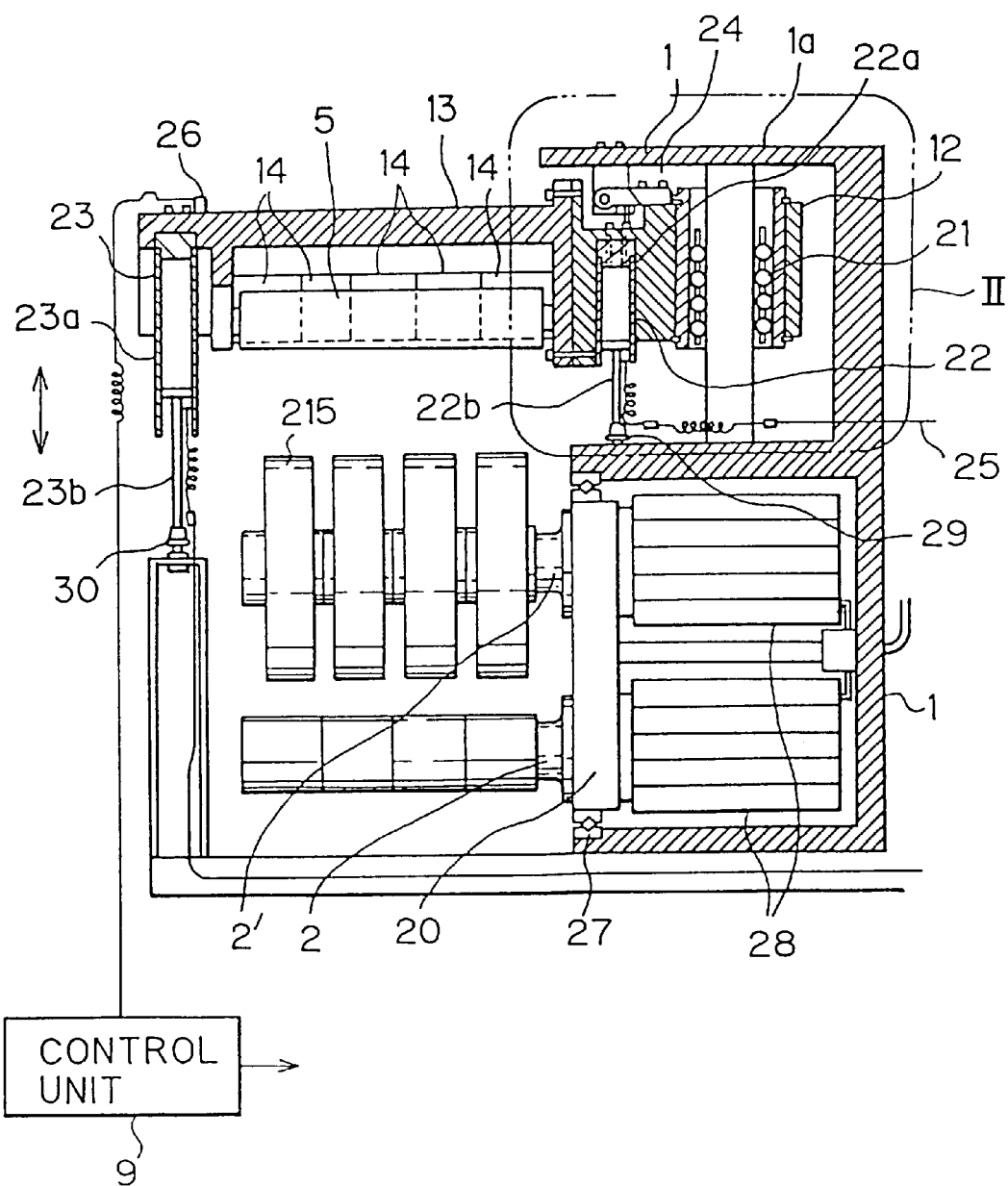
FIG. 5 is a view taken on line I—I in FIG. 4.

Instead of the above winder having a single spindle, in the case where a turret type winder, as shown in FIG. 5, is used, in which a plurality of spindles are rotatably attached to the turret member so as to wind a yarn, the operation is conducted in the following manner. When the yarn setting operation is completed by the yarn setting mechanism (not shown), or when a fully loaded tube 215 is switched to an empty tube 100 by the yarn switching mechanism (not shown), the winding diameter calculating means (not shown) is operated and the amount of formed yarn layer 220 is calculated. Then the pressure roller 5 is forcibly contacted with the yarn layer 220 formed on the tube 100, and at the same time, the surface speed of the pressure roller 5 is controlled to be higher than that of the empty tube 100 until the yarn 200 is switched to the empty tube side, wherein the controlled speed is approximately the same as or lower than the surface speed of the fully loaded tube 215, and the surface speed of the pressure roller 5 is controlled to be approximately the same as the surface speed of the yarn layer 220 formed on the empty tube 100 after the yarn has been switched to the empty tube. When speed control is conducted in the above manner, fluctuation of tension can be avoided in the yarn switching operation, and the yarn can be switched from the fully loaded tube to the empty tube while the yarn is not torn off or the yarn is not wound around the pressure roller 5.

When the speed of the pressure roller 5 is switched at least before the yarn starts traversing, the characteristics of the yarn wound around the tube can be made uniform from the most inner to the most outer layer.

In the above winder, a slippage is caused in the electric motor for driving the pressure roller when the pressure roller 5 is rotated. The slippage caused in the case where the winder is stopped over a long period of time and the bearing temperature is low, is different from the slippage caused in the case where the winder has been operated for a predetermined period of time and the bearing temperature is high.

Therefore, it is necessary to calculate the slippage at least before the pressure roller 5 comes into contact with the winding package such as an empty tube 100, in the yarn setting and yarn switching operation. In the case of the manual yarn switching type winder shown in FIG. 1, it is necessary to calculate the slippage before the completion of yarn setting operation after the start of the winder, or before the completion of yarn setting operation after the fully loaded tube was replaced with the empty tube after the completion of winding. In the case of the turret type winder, it is preferable that the yarn setting operation for the start of winding is completed. That is, it is preferable that the slippage is calculated before the yarn is switched from the fully loaded tube to the empty tube after the completion of winding.

In this connection, in order to improve the success ratios of yarn setting and yarn switching, the rotational speed of the spindle is set to be a little higher than the winding speed in the case of yarn setting or yarn switching. After the completion of yarn setting or yarn switching, the rotational speed of the spindle is reduced to a predetermined winding speed.

Therefore, the slippage caused in the electric motor 6 when it drives the pressure roller 5 in the first yarn setting operation and the first yarn switching operation, is calculated under the condition that the winder is operated at the yarn setting speed or the yarn switching speed and further the pressure roller 5 is not contacted with the spindle 2.

First, the calculation method for calculating a slippage will be explained as follows.

The first yarn setting operation is taken for an example. When the yarn setting speed is SI (m/min), the diameter of the pressure roller 5 is DR (m), and the number of poles of the electric motor 6 is p1, the command frequency RO1 (Hz) is expressed as follows when the slippage is neglected.

$$RO1 = \frac{SI}{\pi \times DR} \times \frac{p1}{120} \quad (1)$$

When the number of pulses per one revolution of the pressure roller is P1, the number of pulses RFP1 (pulse/sec) corresponding to the yarn setting speed SI of the pressure roller can be calculated by the following expression.

$$RFP1 = \frac{2 \times RO1}{p1} \times P1 \text{ (pulse/sec)} \quad (2)$$

When the number of rotation detecting pulses of the pressure roller is RFP2 (pulse/sec), the slippage $\eta F$ can be calculated by the following expression.

$$\eta F = 1 - \frac{RFP2}{RFP1} \quad (3)$$

After substitution of RFP1 from the above expression (2) to the expression (3), slippage $\eta F$ can be calculated from the command frequency RO1 (Hz) and the number of pressure roller rotational detecting pulses RFP2 (pulse/sec). The expression is shown as follows.

$$\eta F = 1 - \frac{RFP2 \times p1}{2 \times RO1 \times P1} \quad (4)$$

On the other hand, when the package diameter is DM (m) and the number of poles of the electric motor 3 for driving the spindle is p2, the command frequency SF1 (Hz) of the electric motor 3 is expressed as follows.

$$SF1 = \frac{SI}{\pi \times DM} \times \frac{p2}{120} \text{ (Hz)} \quad (5)$$

When the number of pulses per one revolution of the spindle is P2, the number SFP1 (pulse/sec) of pulses corresponding to the yarn setting speed of the spindle is calculated by the following expression.

$$SFP1 = \frac{2 \times SF1}{p2} \times P2 \text{ (pulse/sec)} \quad (6)$$

The pressure roller drive control operation of the above manual yarn switching type winder will be explained as follows.

First, an operation switch (not shown) is pressed so that the traverse head 4 is lowered. When the pressure roller 5 is stopped at a slippage measuring position separate from the spindle 2 by a predetermined distance, the electric motor 3 for driving the spindle and the electric motor 6 for driving the pressure roller are activated, so that the spindle 2 and pressure roller 5 are rotated.

At this time, in order to maintain a predetermined speed, feedback control is conducted on the electric motor 3 so that the number of pulses of the output shaft of the electric motor 3 for driving the spindle, the pulses being sent from the first detector 7, can become equal to the number SFP1 (pulse/sec) of pulses corresponding to the yarn setting speed SI, wherein the number SFP1 (pulse/sec) of pulses is calculated by the above expression (6).

In this connection, the electric motor 6 for driving the pressure roller is driven in accordance with the command frequency RO1 (Hz) found by the expression (1).

Under this condition, the number RFP2 (pulse/sec) of pressure roller rotation detecting pulses of the pressure roller 5 is detected by the second detector 8 and sent to the control unit 9. Then the slippage $\eta F$ is calculated by the expression (4) and stored in the control unit 9.

Then the correction command frequency RF1 (Hz) given to the electric motor 6 for driving the pressure roller at the yarn setting speed SI (m/min) is calculated by the following expression (7) to which the slippage $\eta F$ is added.

$$RF1 = \frac{SI}{\pi \times DR} \times \frac{p1}{120} \times \frac{1}{1 - \pi F} \text{ (Hz)} \quad (7)$$

When the electric motor 6 is subjected to open loop control by the above correction command frequency RF1 (Hz) and the pressure roller 5 is rotated, the yarn is set around the tube attached to the spindle 2.

After the yarn has been set around the tube, the winding operation starts. Then the electric motor 6 for driving the pressure roller is subjected to open loop control by the command pressure roller frequency OM (Hz) obtained from the following expression (8).

When the steady winding speed is SM (m/min), the command pressure roller frequency OM (Hz) is calculated by the following expression.

$$OM = \frac{p1 \times SM}{60 \times \pi \times DR} \times \frac{1}{1 - \pi F} \text{ (Hz)} \quad (8)$$

In this connection, the electric motor 3 for driving the spindle is subjected to feedback control so that the number of pulses of the output shaft of the electric motor 3 sent from the first detector 7 can be equal to the number of pulses SMP (pulse/sec) corresponding to the steady winding speed SM of the spindle calculated by the following expression (9).

$$SMP = \frac{SM}{60 \times \pi \times DM} \times P2 \text{ (pulse/sec)} \quad (9)$$

In the above expression (9), DM is a package diameter (m), which is the same as the tube diameter at the start of yarn winding operation.

In this case, the package diameter DM (m) is calculated by the following expression (10)

$$DM = \left(\frac{T \times L \times 4}{W \times \rho \times \pi} + DS^2\right)^{1/2} \text{ (m)} \quad (10)$$

where the winding time is T (min), the amount of discharged polymer spun out from a spinning machine (not shown) is L (g/min), the yarn winding width is W (m), the package density is ρ (g/m³), and the tube diameter is DS (m).

In accordance with the value calculated by the above expression, the yarn 200 is wound so that the yarn layer 200 is formed on the tube 100. Then, the outer peripheral portion of the yarn layer comes into contact with the pressure roller 5, so that a steady winding condition is provided. Then the electric motor 3 for driving the spindle is subjected to feedback control so that the number of pulses of pressure roller revolution detection can be coincident with the number of pulses RPM (Hz) corresponding to the steady winding speed SM of the pressure roller. The number of pulses RPM (Hz) corresponding to the steady winding speed SM of the pressure roller is calculated by the following expression.

$$RMP = \frac{SM}{60 \times \pi \times DR} \times P1 \text{ (pulse/sec)} \quad (11)$$

In the case where the yarn 200 is wound under the condition of overfeeding, the command pressure roller frequency OS (Hz) is calculated by the following expression, wherein the overfeeding ratio is F%.

$$OS = \frac{p1 \times SM}{60 \times \pi \times DR} \times \frac{1}{1 - \eta F} \times \left(1 + \frac{F}{100}\right) \text{ (Hz)} \quad (12)$$

In general, it is sufficient that the above overfeeding ratio is 0 from the start to the end of winding, or the above overfeeding ratio is set to be a constant value. However, for the purpose of improving the configuration of a package, it is possible to define the overfeeding ratio as a function of the winding diameter or the winding time.

In the manual operation type winder shown in FIG. 1, after a predetermined amount of yarn has been wound, the yarn is cut off, and the fully loaded package is replaced with an empty tube so as to conduct the yarn setting operation.

The aforementioned winder is continuously operated for a predetermined period of time. Therefore, the temperatures of bearings and others are raised, so that the slippage is varied.

Accordingly, before the start of yarn setting operation, the slippage of the pressure roller 5 is calculated in the same manner as that of the first yarn setting operation.

In the manual switching type winder, the above calculation for calculating the slippage is conducted for each yarn setting operation. It is also possible to conduct the calculation every other yarn winding operation.

Next, calculation of slippage in the turret type winder, as shown in FIG. 5, will be explained as follows.

When a turret type winder is used, in which a plurality of spindles 2, 2' are attached to the turret member 20, the winding operation is conducted in such a manner that a yarn 200 is successively switched from a spindle 2 having a fully loaded tube 215 to a spindle 2' having an empty tube 100. In this case, slippage is calculated in the following manner: At the first yarn setting operation, and also before a fully loaded tube around which a predetermined amount of yarn has been wound is switched to an empty tube, under the condition that the pressure roller 5 is not contacted with the spindle 2, slippage between the bearing of the pressure roller 5 and the electric motor 6 is calculated from the command frequency with respect to the yarn switching speed of the electric motor 6 for driving the pressure roller, and also from the number of pressure roller revolution detecting pulses.

Slippage in the above turret type winder as shown in FIG. 5, is calculated in the following manner:

The yarn setting speed SI (m/min) in the above expression (1) is substituted by the yarn switching speed SH (m/min). Then the command frequency (Hz) for the electric motor 6, and the number of pulses (pulse/sec) corresponding to the pressure roller yarn switching speed SH, are calculated, and then slippage is calculated by the slippage calculating expression.

That is, when the slippage is neglected, the command frequency RH1 (Hz) is expressed by the following expression.

$$RH1 = \frac{SH}{\pi \times DR} \times \frac{p1}{120} \text{ (Hz)} \quad (13)$$

The number of pressure roller feedback pulses RFHP1 (pulse/sec) is calculated by the following expression.

$$RFHP1 = \frac{2 \times RH1}{p1} \times P1 \text{ (pulse/sec)} \quad (14)$$

When the number of pressure roller rotation detecting pulses is RFHP2 (pulse/sec), slippage ηH is calculated by the following expression.

$$\eta H = 1 - \frac{RFHP2}{RFHP1} \quad (15)$$

When RFHP1 in the above expression (14) is substituted by RFP1 in the expression (15), slippage ηH can be calculated from the command frequency RH1 (Hz) and the number of pressure roller rotation detecting pulses RFHP2 (pulse/sec). The expression is described as follows.

$$\eta H = 1 - \frac{RFHP2 \times p1}{2 \times RH1 \times P1} \quad (16)$$

In the turret type winder, the above calculation for calculating the slippage is conducted at the first yarn setting operation and at the time of each yarn setting operation. However, it is also possible to conduct the calculation every other yarn winding operation.

In the above example, slippage is calculated when the rotational speed of the pressure roller 5 is detected as the number of pulses, however, slippage can be also calculated when the rotational speed is detected by a tachometer type generator as the number of revolution.

As described in the above example, when slippage is calculated, the electric motor 6 for driving the pressure roller 5 is controlled in accordance with the command frequency calculated by the expression (1) in which slippage is neglected or the expression (13), and after slippage has been calculated, the electric motor 6 for driving the pressure roller is controlled in accordance with the slippage corrected by the calculated slippage. Therefore, the number of revolution of the pressure roller is changed by the amount of slippage.

In order to reduce a change in the number of revolution of the pressure roller, the amount of slippage calculated before is added to the yarn setting value SI in the expression (1) or the yarns switching speed SH in the expression (13).

The aforementioned slippages ηF and ηH are calculated in accordance with the command frequency of the electric motor 6 for driving the pressure roller, and the number of pressure roller rotation detecting pulses, or the slippages ηF and ηH are calculated in accordance with the number of pressure roller rotation detecting pulses, and the number of pulses corresponding to the pressure roller yarn setting speed or yarn switching speed calculated while the slippage is neglected. However, the slippages ηF and ηH can be calculated in the following manner:

The rotational speed or frequency is substituted in the above expression of the number of pulses, and the slippage can be found from the pressure roller detecting rotational speed in the case where the pressure roller is rotated by the electric motor, and also from the rotational speed calculated when slippage is neglected, and also the slippage can be found from the command frequency in the case where the pressure roller is rotated by the electric motor, and also from the frequency calculated while slippage is neglected.

Of course, the above drive control method can be applied to a turret type winder in which a plurality of spindles are attached to the turret member.

Next, the construction of the yarn winder of the present invention will be explained as follows.

Figure 4:
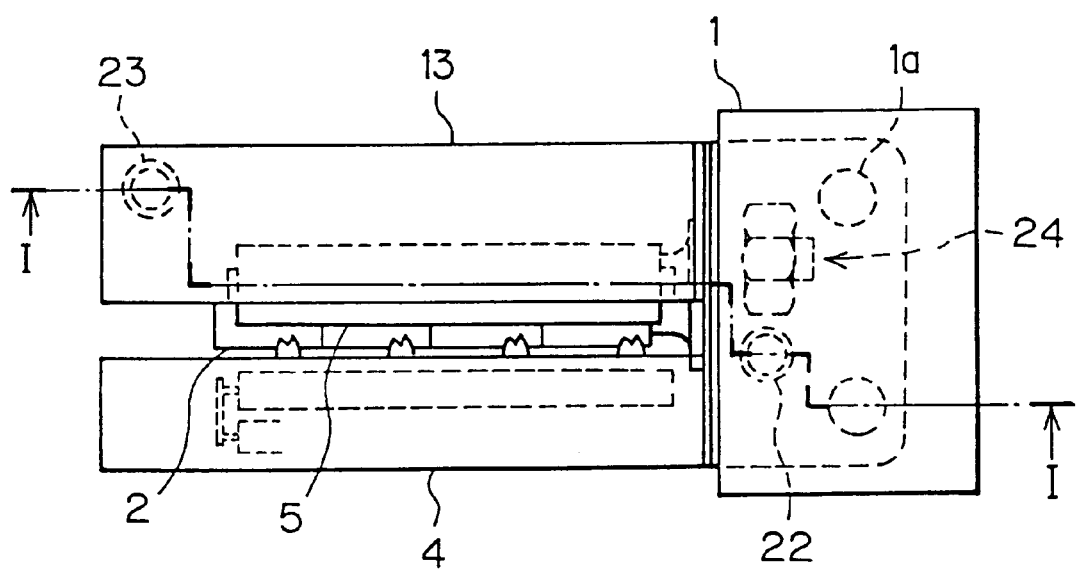
FIG. 4 is a plan view showing an outline of an example of the yarn winder of the present invention.
Figure 6:
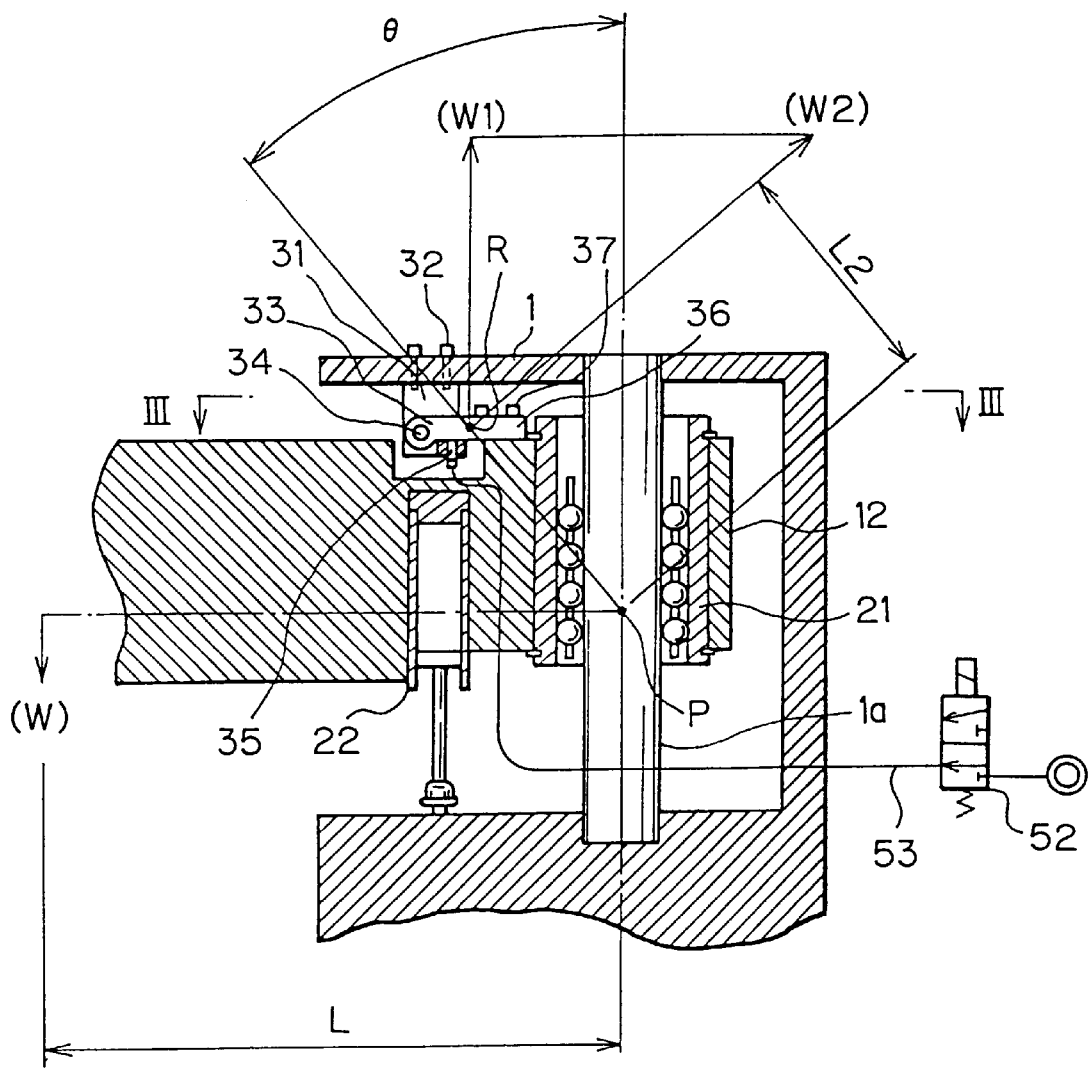
FIG. 6 is an enlarged view showing the portion II outline in FIG. 5.
Figure 7:
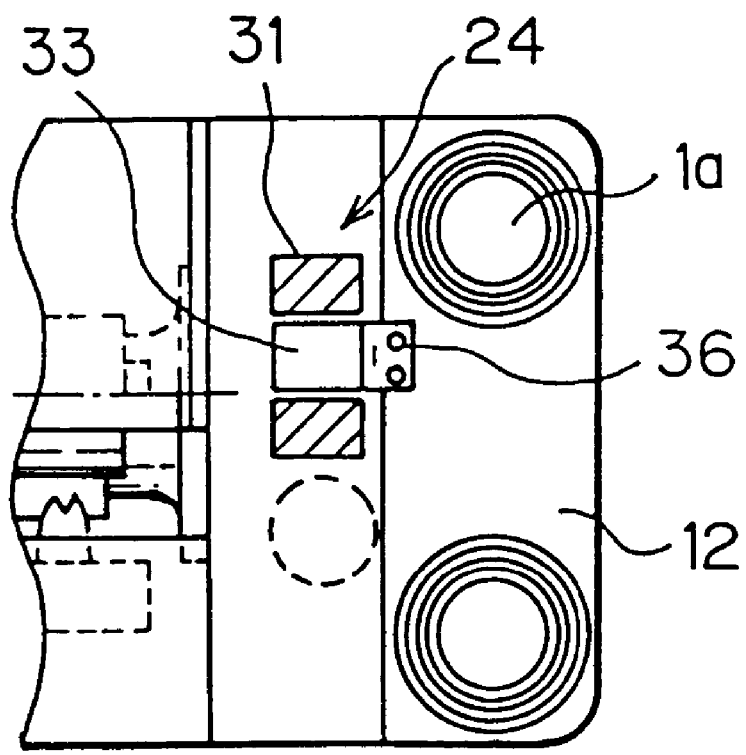
FIG. 7 is a view taken on line III—III in FIG. 6.

FIG. 4 is a plan view showing an outline of an example of the yarn winder of the present invention. FIG. 5 is a view taken on line I—I in FIG. 4. FIG. 6 is an enlarged view showing an outline of the portion II in FIG. 5. FIG. 7 is a view taken on line III—III in FIG. 6. The winder includes: a turret member 20 rotatably provided in the machine frame 1; two spindles 2, 2' rotatably provided in the turret member 20 for supporting a plurality of tubes 100; a slider 12 mounted in a cantilever manner on the two guides 1a provided in the machine frame 1, a sliding ball bearing 21 being used so that the slider 12 can be vertically elevated; a frame body 13 integrally attached to the slider 12; a traverse unit 4; a pressure roller 5 rotatably attached to the frame body 13 through a bearing (not shown in the drawing); a traverse unit 14 integrally attached to the frame body 13 so that the traverse unit 14 can be positioned in the upstream of the pressure roller 5; a first hydraulic cylinder 22 for supporting the slider, the first hydraulic cylinder 22 being disposed close to the guide 1a; a second hydraulic cylinder 23 for supporting the frame body, the second hydraulic cylinder 23 being disposed at a fore end portion of the frame body 13; a stopper means 24 provided in the machine frame 1 so that the stopper means 24 can be positioned above the first hydraulic cylinder 22; a hydraulic fluid supply pipe 25 connected with the hydraulic cylinders 22, 23; and a control unit 9 for controlling the rotation of the spindle 2 and also controlling the supply of hydraulic fluid to the hydraulic cylinders 22, 23.

It is possible to attach the traverse unit 4 to the frame body 13, and it is also possible to rotatably attach the pressure roller to the traverse unit 4.

The pressure roller 5 is provided with an electric motor for driving, or alternatively the pressure roller 5 is driven by the spindle 2.

The aforementioned slider 12 and frame body 13 are composed of two members, however, they may be formed into an integrated frame body from one member, or the machine frame of the traverse unit may be formed into the frame body.

A vibration detector 26 is mounted on an upper fore end portion of the frame body 13, and a detected oscillation value is sent to the control unit 9.

The turret member 20 is rotatably attached to the machine frame 1 through a bearing 27. By the action of a drive unit (not shown), one spindle 2 is rotated from a winding position to a waiting position, and the other spindle 2 is rotated from the waiting position to the winding position.

The spindle 2 is rotatably attached to the turret member 20 through a bearing (not shown), and rotated by the electric motor 28 connected with an end portion of the spindle 2.

The following constructions are used for the traverse unit 4:

One is a construction in which a cam shoe to which a yarn guide is integrally attached is engaged with a groove of a scroll cam roller, and when the scroll cam roller is rotated, the cam shoe is reciprocated, so that a yarn can be traversed. The other is a construction in which a yarn is traversed by a rotational body having a plurality of impellers.

Single acting cylinders are used for the hydraulic cylinders 22, 23. The cylinder bodies 22a, 23a are fixed to the predetermined positions of the slider 22 and frame body 13 with screws (not shown) so that the piston rods 22b, 23b can be positioned downward, and end portions of the piston rods 22b, 23b are attached to the machine frame 1 through spherical bearings 29, 30.

The above hydraulic cylinders 22, 23 are disposed in the following manner:

The axis of each hydraulic cylinder is vertically disposed being perpendicular to the axis of the pressure roller 5, and the hydraulic cylinders 22, 23 are disposed at a predetermined interval on a line passing through the gravity center G of the frame body 13, pressure roller 5 and traverse unit 4 in parallel with the axis of the pressure roller 5.

However, consideration must be given to the setting position of the hydraulic cylinder 23 at which interference can be avoided in the movement of a fully loaded package from the winding position to the waiting position and also interference can be avoided in the lifting motion of the fully loaded package. Also, consideration must be given to the adjustment of the setting positions of the hydraulic cylinders 22, 23 so that the setting positions can be easily adjusted with respect to the position of gravity center G. Therefore, as shown in FIG. 4, it is preferable that the hydraulic cylinders 22, 23 are disposed in the following manner: The axis of each cylinder is vertical and perpendicular to the axis of the pressure roller 5, and the hydraulic cylinders are disposed in the horizontal direction perpendicular to the longitudinal direction of the axis of the pressure roller 5 so that the hydraulic cylinders are positioned on the line passing through the gravity center position G of the frame body 13, pressure roller 5 and traverse unit 4.

As illustrated in FIGS. 6, 7, the stopper means 24 includes: a mounting member 31 mounted on the machine frame 1 with bolts 32; a stopper member 33 rotatably attached to the mounting member 31 with a pin 34; a hydraulic cylinder 35 for rotating the stopper member 33; and an engaging member 36 attached to the slider 12 with bolts 37.

The cylinder 35 is connected with a supply pipe 53 having an electromagnetic valve 52 for supplying actuating fluid such as compressed air.

When the piston rod of the hydraulic cylinder 35 is protruded under the condition that the engaging member 36 is pushed upward together with the slider 12 by the hydraulic cylinders 22, 23, the stopper member 33 is rotated counterclockwise and moved to the waiting position, so that the engaging member 36 can be moved downward.

It is necessary that a contact surface between the stopper member 33 and the engaging member 36 is formed in the following manner:

A lower tangential line of the contact surface is inclined toward the cantilever supporting side of the slider 12 with an angle larger than 0° and smaller than 45° with respect to the vertical line, so that a component force W2 generated on the contact surface can offset a moment activated on the sliding ball bearing 21.

The inclination angle θ is set in an angular range from an angle at which a moment generated by the angle θ becomes lower than an allowable moment of the sliding ball bearing 21, to an angle at which the engaging member 36 can be positively supported by the stopper member 33 irrespective of the rigidity and error caused in the machining and assembling processes of the stopper member 33 and engaging member 36 of the stopper means 24.

When the contact surface of the engaging member 36 is formed into an arc, the vertex of which is a point of application R of the component force, and the radius of which is 100 to 200 mm, the engaging position can be made constant.

Figure 8:
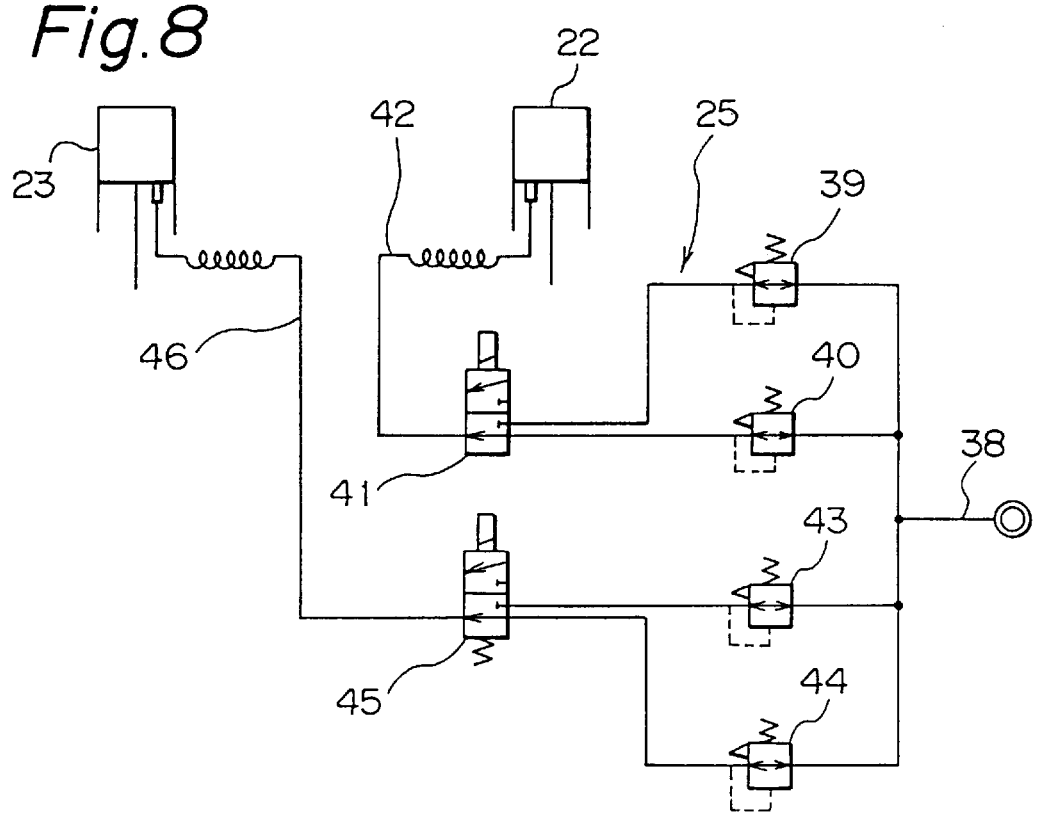
FIG. 8 is a schematic illustration showing the first example of the hydraulic fluid supply pipe connected with the hydraulic cylinder shown in FIG. 4.

As illustrated in FIG. 8, in the hydraulic fluid supply pipe 25, in order to supply hydraulic fluid to the first hydraulic cylinder 22, pressure regulating valves 39, 40 for regulating the pressure of fluid supplied from the hydraulic fluid supply primary pipe 38 at a predetermined value, an electromagnetic changeover valve 41 for changing over the hydraulic fluid supply pipe line, and a supply pipe 42 for supplying hydraulic fluid, are connected with the piston rod 22b of the hydraulic cylinder 22. Also, in order to supply hydraulic fluid to the second hydraulic cylinder 23, pressure regulating valves 43, 44 for regulating the pressure of fluid supplied from the hydraulic fluid supply primary pipe 38 at a predetermined value, an electromagnetic changeover valve 45 for changing over the hydraulic fluid supply pipe line, and a supply pipe 46 for supplying hydraulic fluid, are connected with the piston rod 23b of the hydraulic cylinder 23.

It is necessary to use a flexible tube for a portion of the supply pipes 42, 46 so that the piston rods 22b, 23b can be smoothly reciprocated.

Instead of the above hydraulic cylinders 22, 23, it is possible to use a hydraulic cylinder constructed in such a manner that hydraulic fluid is supplied to the cylinder bodies 22a, 23a.

In accordance with an operation signal sent from the control unit 9, the electromagnetic changeover valves 41, 45 are activated, so that hydraulic fluid of high or low pressure can be supplied to the hydraulic cylinders 22, 23.

Figure 9:
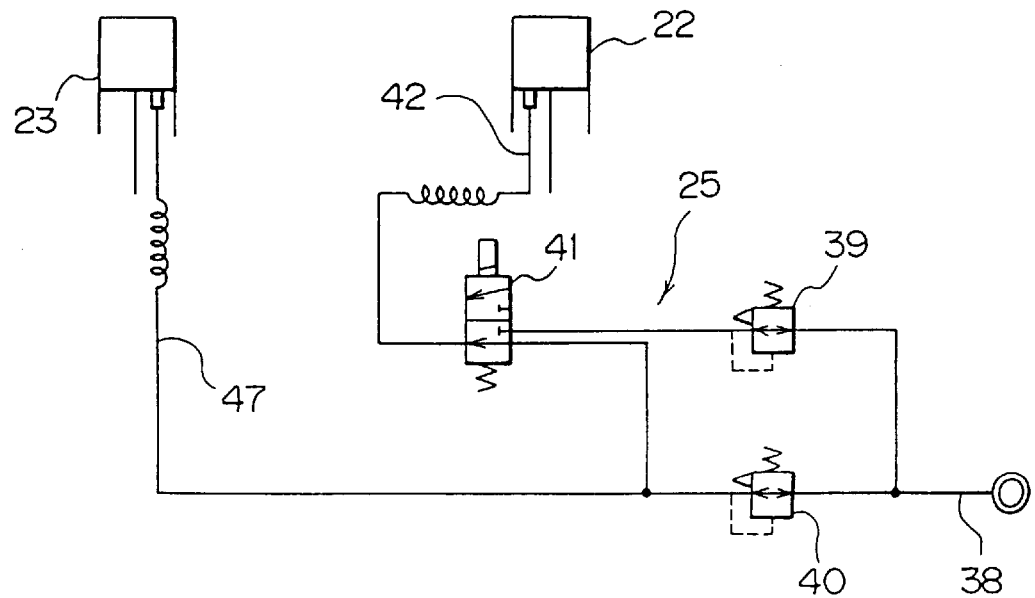
FIG. 9 is a schematic illustration showing the second example of the hydraulic fluid supply pipe connected with the hydraulic cylinder shown in FIG. 4.

As illustrated in FIG. 9, in the hydraulic fluid supply pipe 25, the pressure regulating valve 40 of the first cylinder 22 may be commonly used, and hydraulic fluid may be supplied to the second hydraulic cylinder 23 through the supply pipe 47.

Figure 10:
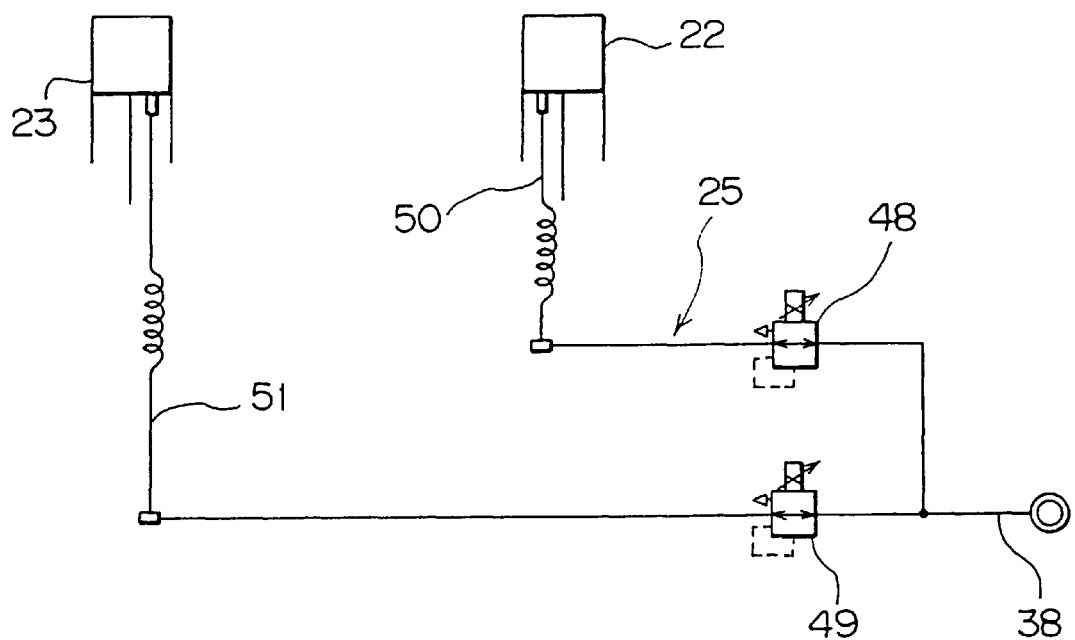
FIG. 10 is a schematic illustration showing the third example of the hydraulic fluid supply pipe connected with the hydraulic cylinder shown in FIG. 4.

Further, as illustrated in FIG. 10, in the hydraulic fluid supply pipe 25, instead of the pressure regulating valves 39, 40, 43, 44, electric-pneumatic converters 48, 49 may be used, by which hydraulic pressure is arbitrarily adjusted in accordance with an electric signal sent from the control unit 9, so that hydraulic fluid can be supplied to the hydraulic cylinders 22, 23 through the supply pipes 50, 51. According to this construction, the electromagnetic changeover valves 41, 45 can be omitted, and further the surface pressure of the pressure roller 5 can be accurately controlled.

In the yarn winder described above, the slider 12 and frame body 13 are supported by the hydraulic cylinders 22, 23 under the condition that both ends are held. Therefore, moment is seldom applied to the sliding ball bearing 21.

However, in the case where moment is seldom applied to the sliding ball bearing 21, the running resistance of the sliding ball bearing 21 is greatly reduced. As a result, vibration tends to occur in the sliding ball bearing 21.

In order to solve the above problem, when the hydraulic cylinders 22, 23, the inner diameters of which are different, are provided so that different supporting forces can be applied to the frame body 13, a moment to prevent the occurrence of vibration is generated and given to the sliding ball bearing 21.

In this connection, in the case where the frequency of vibration generated by the rotation of the spindle 2 during the yarn winding operation, coincides with the natural frequency of a portion including the slider 12, frame body 13, sliding ball bearing 21 and hydraulic cylinders 22, 23, the operation is carried out in the following manner: Pressures of hydraulic fluid supplied to the hydraulic cylinders 22, 23 are respectively regulated by the pressure regulating valves 39, 40, 43, 44 provided in the hydraulic fluid supply pipe 25. In accordance with a signal sent from the vibration detector 26, the pipe lines of the electromagnetic valves 41, 45 are switched, so that the pressures supplied to the hydraulic cylinders 22, 23 are changed.

Alternatively, the following construction may be employed:

The above vibration detector 26 is not provided. In the control unit 9, the time at which the frequency of vibration generated by the rotation of the spindle coincides with the natural frequency, is calculated in accordance with the winding condition. When the yarn winding time is coincident with the previously calculated time, the pipe lines of the electromagnetic changeover valves 41, 45 are switched.

Alternatively, the following construction may be employed: A rotational speed of the spindle is previously monitored, at which the frequency of vibration generated by the rotation of the spindle coincides with the natural frequency. The monitored rotational speed is previously inputted into the control unit 9. The rotational speed of the spindle is detected during the yarn winding operation. When the detected rotational speed coincides with the previously inputted rotational speed, the pipe lines of the electromagnetic changeover valves 41, 45 are switched.

In the case where it is not necessary to accurately control the surface pressure of the pressure roller 5, only the pressure of hydraulic fluid supplied to the hydraulic cylinder 22 is changed in the hydraulic fluid supply pipe 25 shown in FIG. 9.

When the hydraulic fluid supply pipe 25 having electric-pneumatic converters 48, 49 is used as illustrated in FIG. 10, the contact pressure of the pressure roller 5 can be arbitrarily controlled during the yarn winding operation.

When throttle valves are provided in the supply pipes 42, 46, 47, 50, 51 for supplying hydraulic fluid to the hydraulic cylinders 22, 23 so that the amount of hydraulic fluid discharged from the hydraulic cylinders 22, 23 can be changed, a damping effect can be provided.

Figure 26:
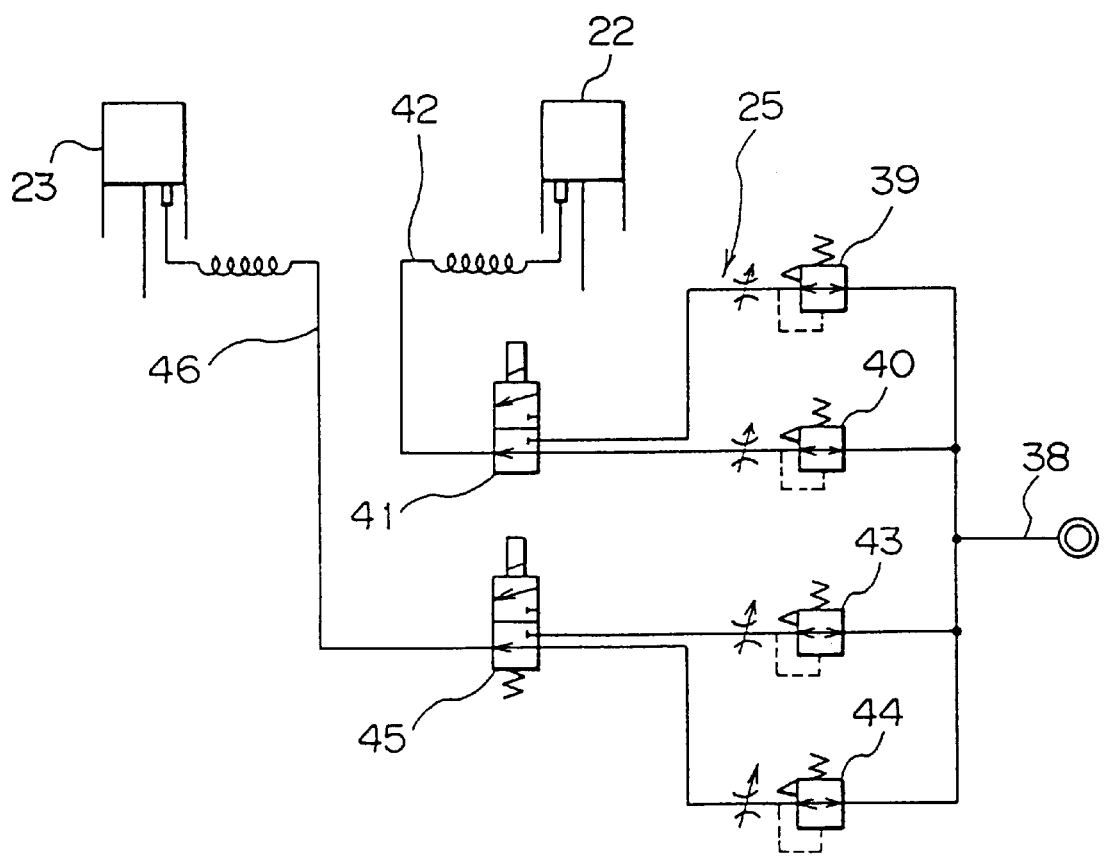
FIG. 26 shows a schematic view of another embodiment of the hydraulic fluid supply pipe.

As shown in FIG. 26, the throttle valves can also be provided on the hydraulic fluid supply pipe arranged between the electromagnetic changeover valve and the pressure regulating valve.

In this case, since the throttle valve is switched simultaneously with the changeover operation of the pressure, a suitable damping effect can be obtained, in response to the pressure applied to this pipe.

When hydraulic-pneumatic converter are provided instead of the throttle valves described above so that hydraulic fluid can be supplied to the hydraulic cylinders 22, 23, damping effect can be provided more effectively.

In the above winder, the moment M0 applied to the sliding ball bearing 21 can be calculated by the following expression.

$$M0 = L \times W - L2 \times W2$$

where the load activated at the center of gravity of the frame body 13 is W; the distance from the center of gravity G to the center of the guide 1a is L; the inclination angle formed between a tangential line and a vertical straight line is θ, wherein the tangential line is formed between the stopper member 33 of the stopper means 24 and the contact surface of the engaging member 36; the reaction force on the contact surface, which is directed upward in the vertical direction, is W1; the component force activated on the contact surface making a right angle is W2; and the distance from the point of application R of the component force W2 to the point of intersection P formed by the extension line of the tangential line and the vertical line of the guide 1a, is L2.

The component force W2 in the above expression is expressed as follows.

$$W2 = W1/\sin \theta$$

In the above winder, the moment M0 applied to the sliding ball bearing 21 is expressed as follows.

$$M0 = 100 \times 200 - 15 \times 1/\sin 10° \times 200 = 2723 \text{ Kg·cm}$$

where the load is 200 Kg; the distance L from the center of gravity G to the center of the guide 1a is 100 cm; the inclination angle θ is 10°; and the distance L2 from the point of application R of the component force W2 to the point of intersection P formed by the extension line of the tangential line and the vertical line of the guide 1a, is 15 cm.

Figure 18:
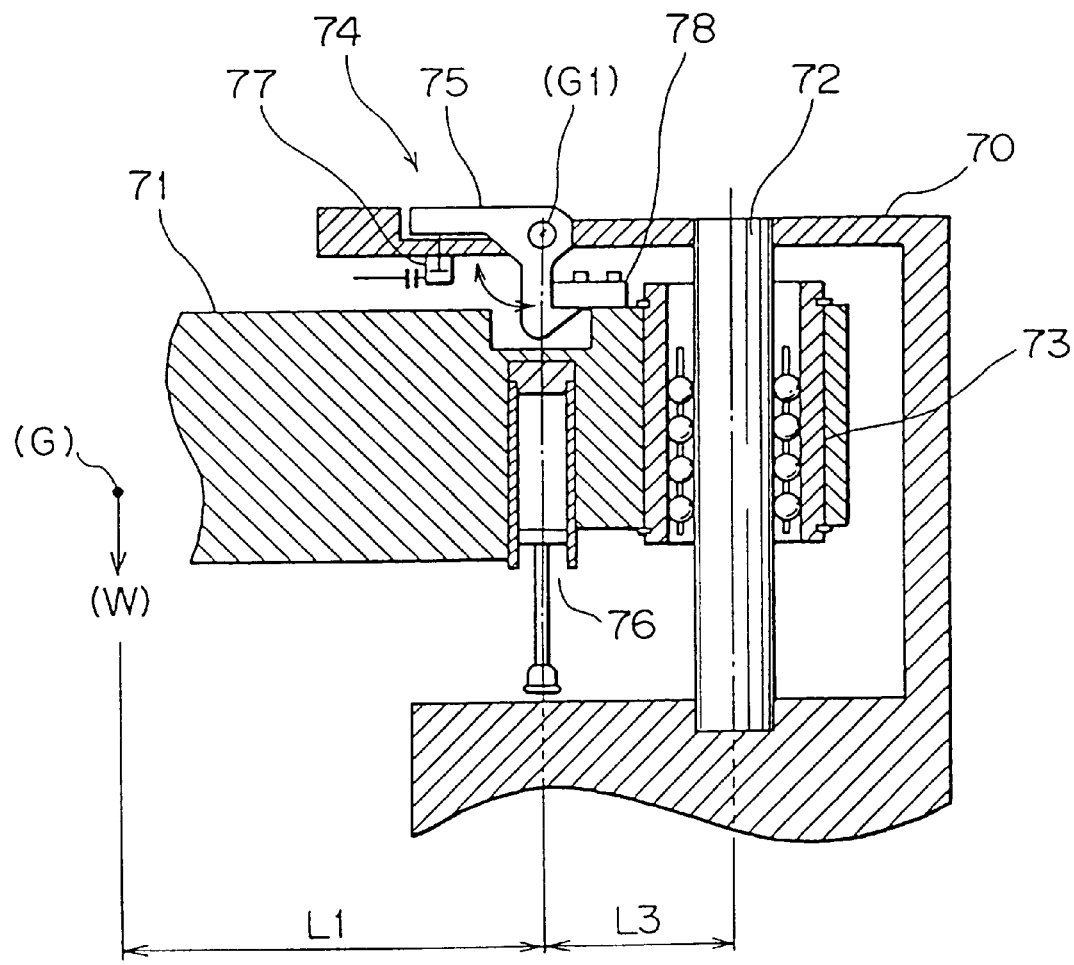
FIG. 18 is a schematic illustration showing an example of the stopper means of the conventional winder.
Figure 19:
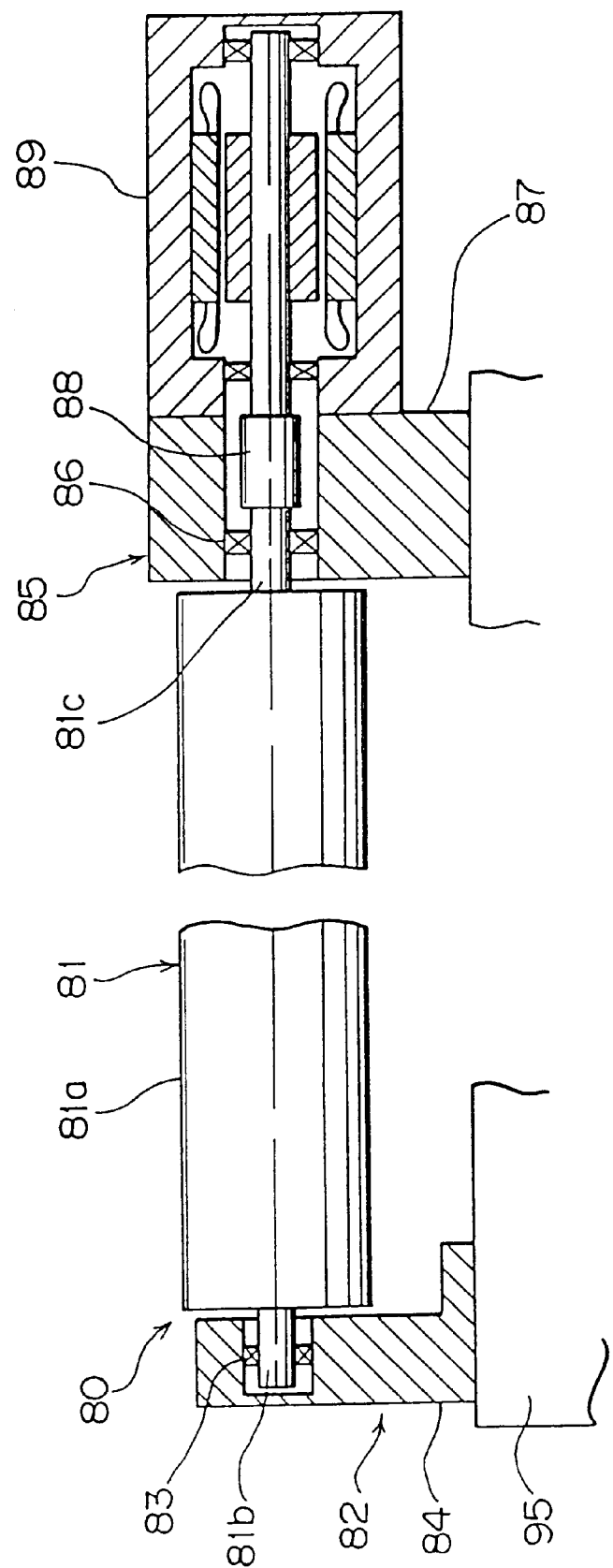
FIG. 19 is a schematic illustration showing an example of the idle type pressure roller of the conventional winder.
Figure 20:
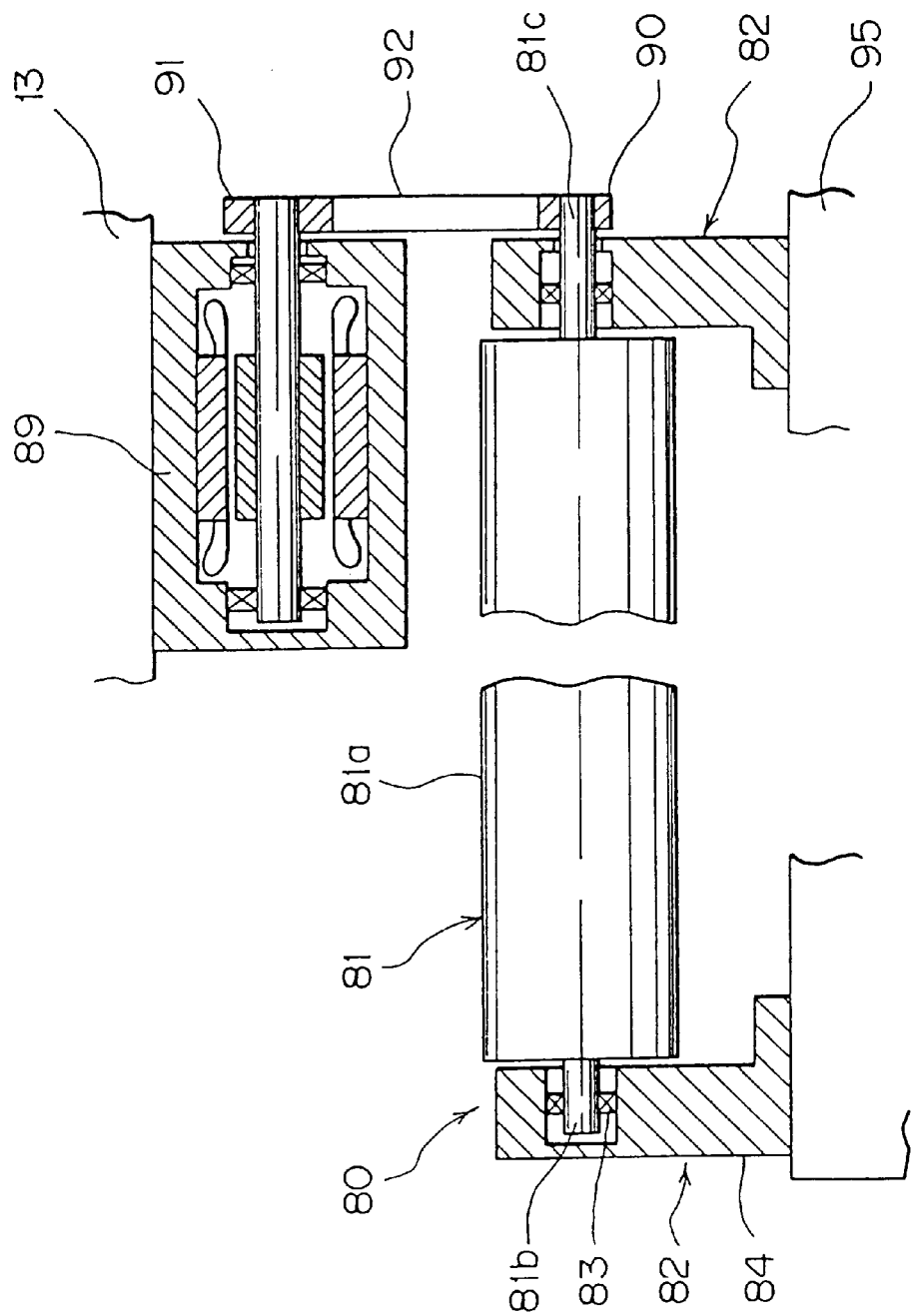
FIG. 20 is a schematic illustration showing the first example of the pressure roller of the conventional winder.
Figure 21:
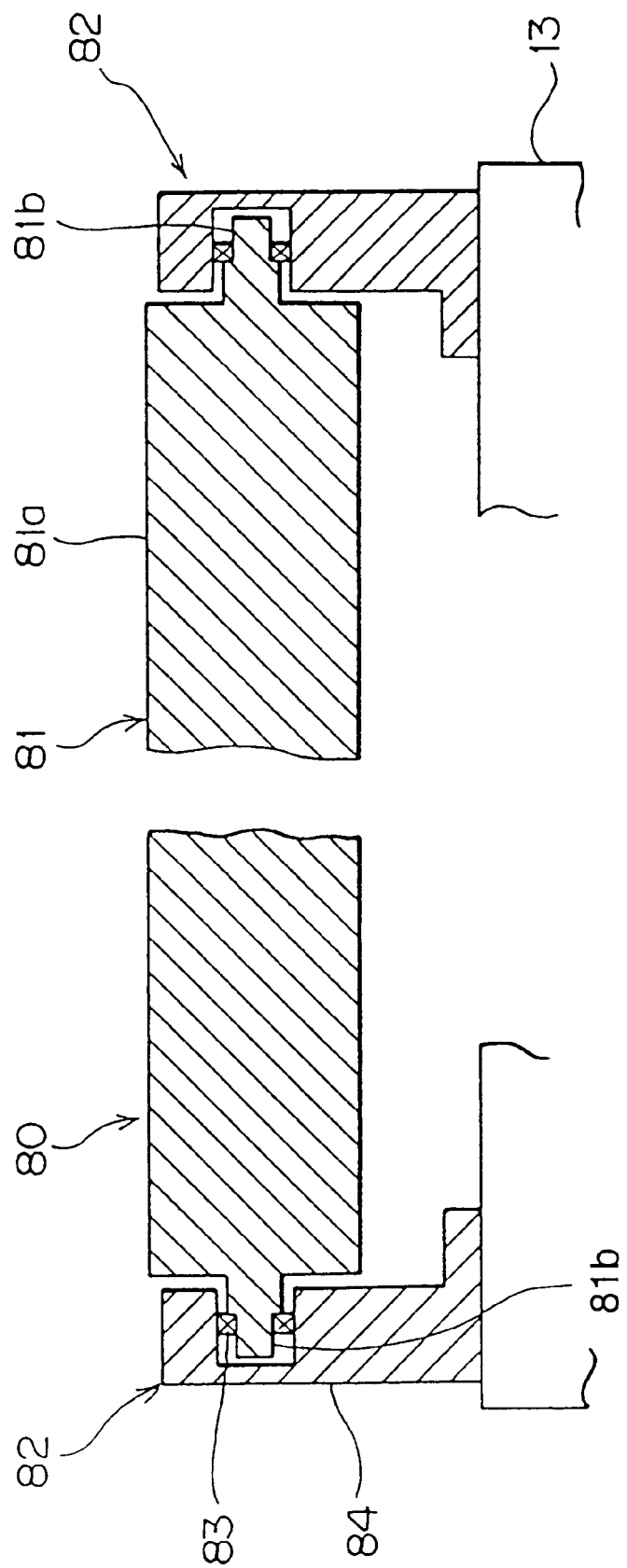
FIG. 21 is a schematic illustration showing the second example of the pressure roller of the conventional winder.
Figure 22:
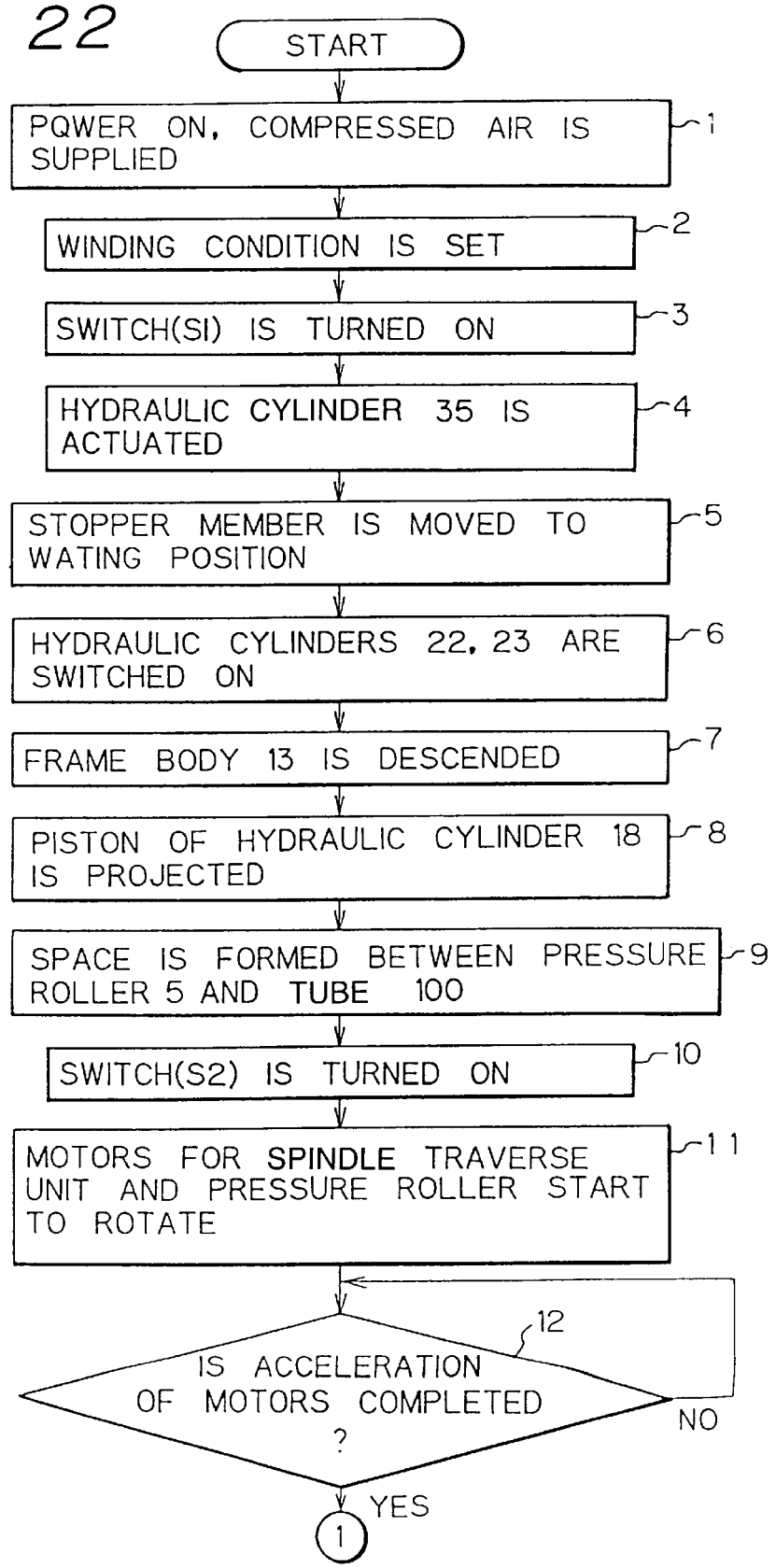
FIGS. 22 to 25 show flowcharts indicating sequences of operations for controlling the drive of the yarn winder of the present invention.
Figure 23:
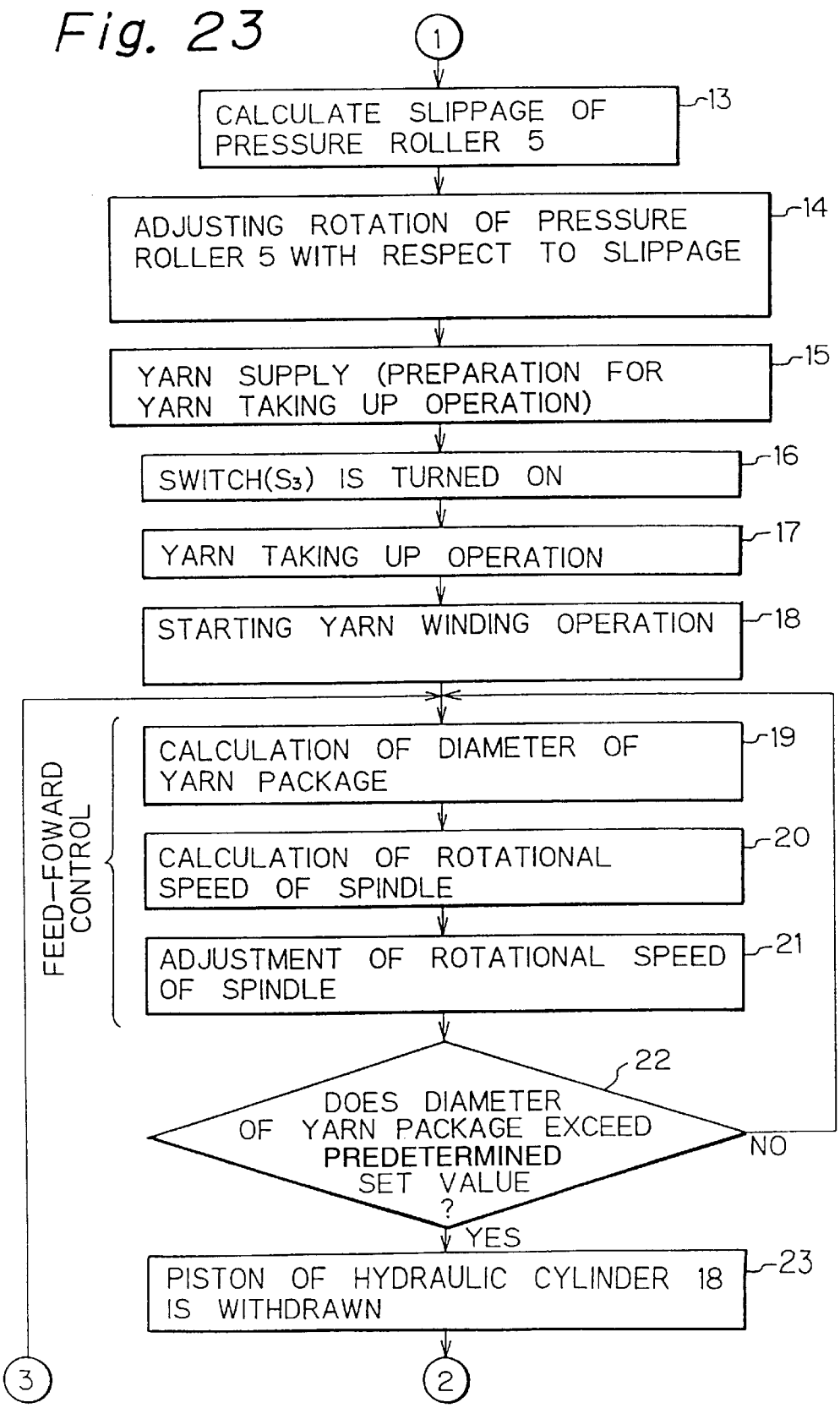
Figure 24:
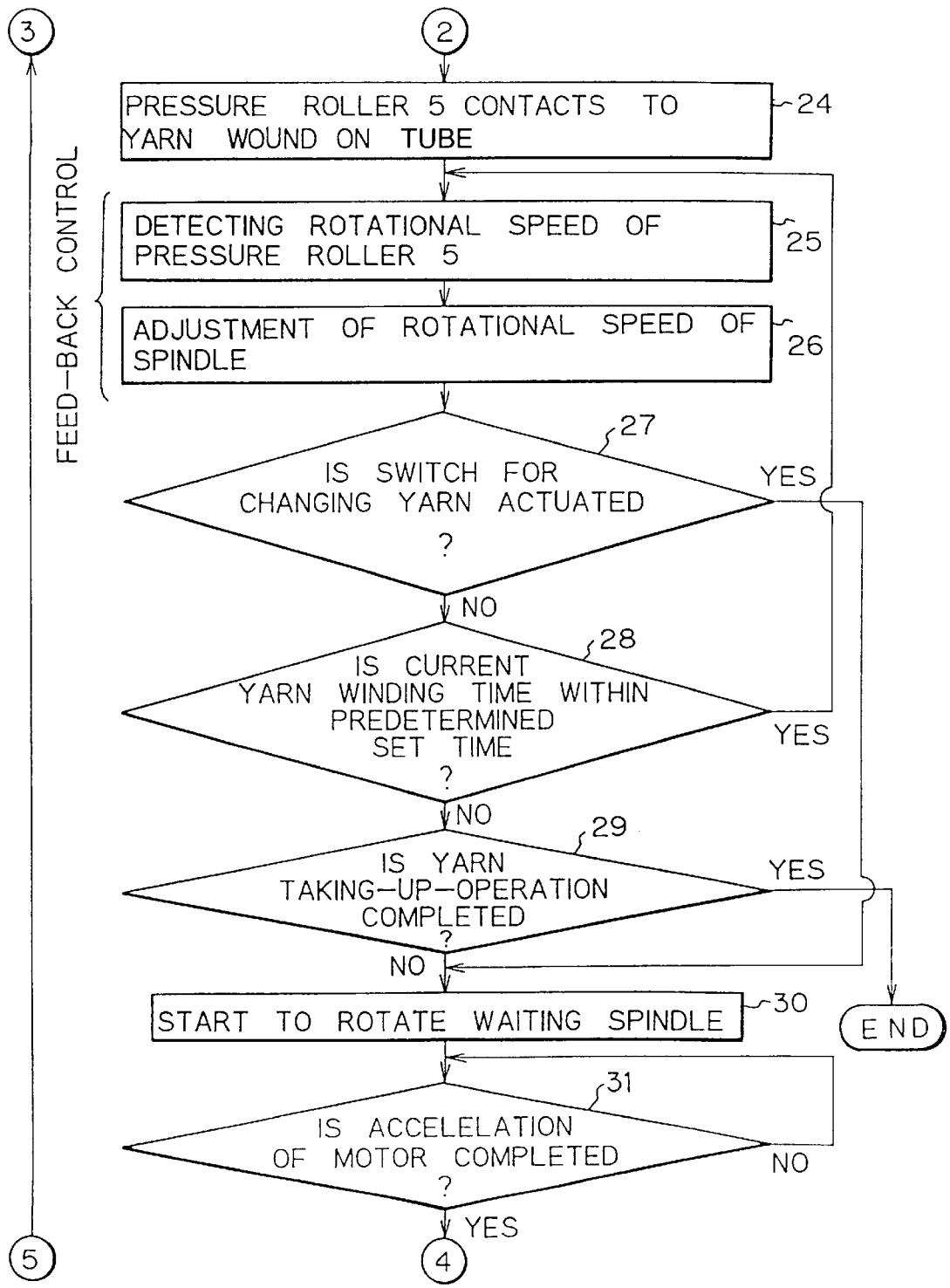
Figure 25:
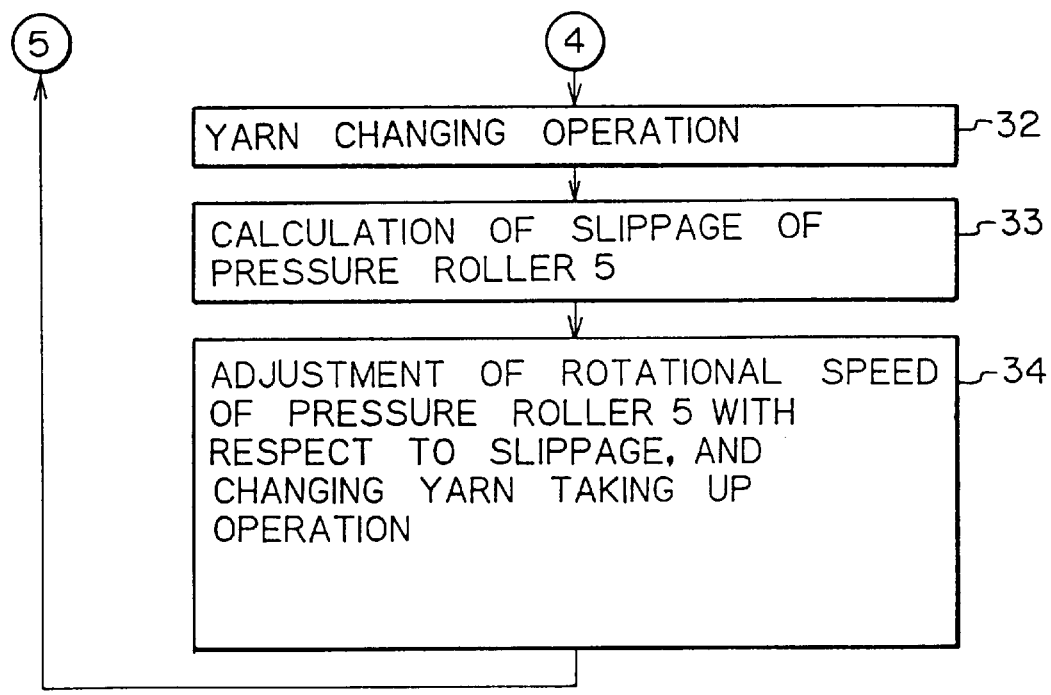

As can be seen from the above expressions, compared with a case shown in FIG. 18 in which the conventional stopper means is used, the moment applied to the sliding ball bearing 21 can be greatly reduced in this case. Therefore, a compact sliding ball bearing, the allowable moment of which is low, can be used.

Of course, the yarn winder of the present invention can be applied to the winder shown in FIG. 1 in which one spindle is provided.

Next, the construction of the pressure roller 5 shown in FIG. 1 will be explained as follows.

Figure 11:
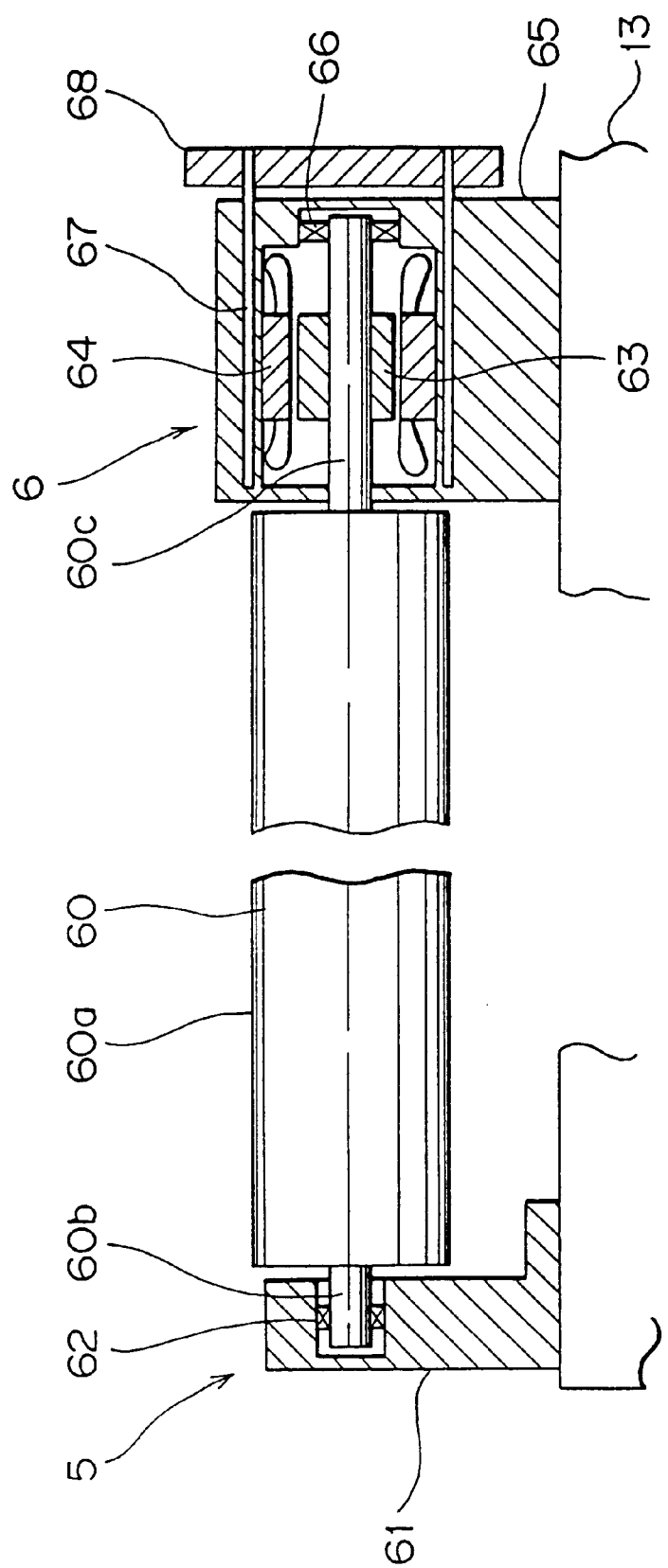
FIG. 11 is a sectional view showing an outline of the first example of the construction of the pressure roller of the winder of the present invention.

FIG. 11 is a sectional view showing an outline of one example of the pressure roller 5. In the pressure roller 5, the electric motor 6 for driving is integrally provided at an end portion of the roller 60. The shaft portion 60b protruded from an end portion of the roller body 60a of the roller 60 is rotatably attached to the bracket 61 through the bearing 62. At the other end portion of the roller 60a, the shaft portion 60c is protruded, and the rotor 63 is mounted on the protruded shaft portion 60c. The end of the shaft portion 60c is rotatably supported by the housing 65 through the bearing 66, wherein the housing supports the stator 64 disposed in such a manner that the stator 64 covers the rotor 63.

The housing 65 described above is of the integrated type or the split type, and attached to the frame body 13.

Figure 14:
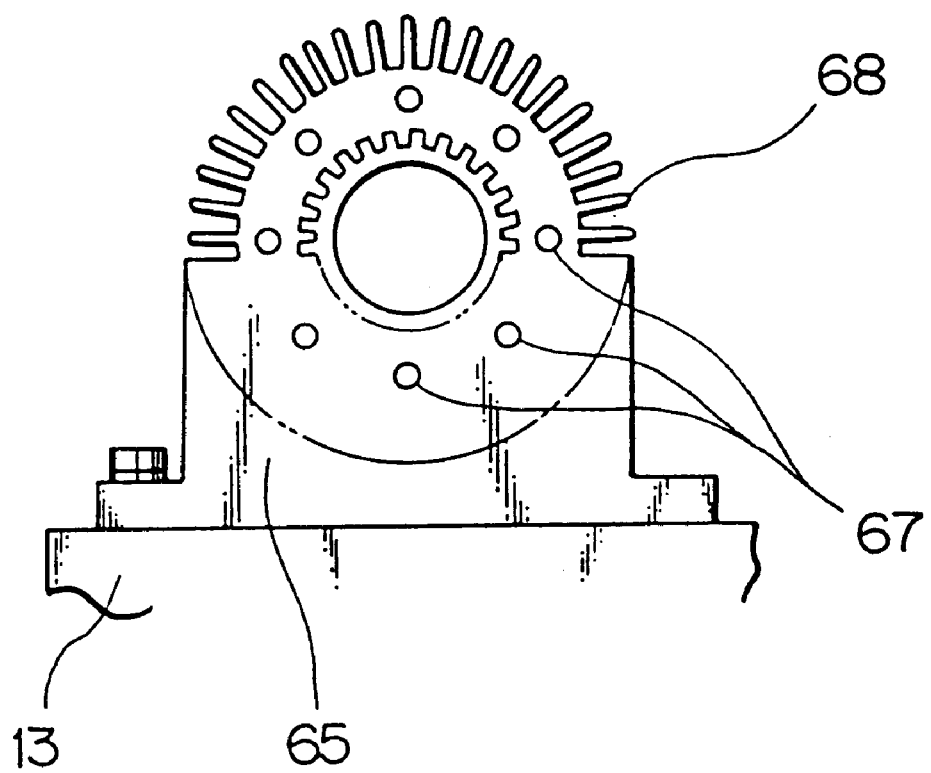
FIG. 14 is an end view of the stator mounting portion of the motor of the winder.

In order to prevent an increase in the temperature of the housing 65, a plurality of heat pipes 67 are provided in the outer periphery of the stator mounting portion in the circumferential direction (shown in FIG. 14) in such a manner that end portions of the heat pipes 67 protrude from the housing 65, and fins 68 for cooling are mounted on the protruding portions of the heat pipes 67.

Instead of the aforementioned fins 68, a jacket in which fluid for cooling is circulated, or a jacket in which fluid for cooling is enclosed may be attached.

In the pressure roller 5 explained above, when the housing 65 is heated by the heat generated in the electric motor 6 section for driving, the generated heat is transmitted to the fins 68 of low temperature through the heat pipes 67 inserted into the housing 65. Therefore, the heat is radiated from the surfaces of the fin 68, and at the same time the heat is also radiated from the peripheral surface of the housing 65.

As described above, the heat in the housing 65 is transmitted to the fins 68 through the heat pipes 67 and radiated. Accordingly, the temperature of the bearing 66 of the electric motor 6 for driving is not abnormally raised, so that the lubricant in the bearing is not deteriorated, and it is possible to prevent the life of the bearing from being reduced. When the operation was carried out under the condition that the yarn winding speed was set at 4000 m/min, the increase in temperature of the bearing portion was reduced by about 20° C. While the bearing of the conventional pressure roller mechanism was replaced when it was operated for about 10000 hours, the bearing of the pressure roller mechanism of the present invention was replaced when it was operated for about 19000 hours which was approximately twice as long.

When the bearing 66 was lubricated by compressed air containing lubricating oil and the yarn winding speed was set at 7000 m/min, the temperature of the roller body 60a was lowered from (the room temperature+19° C.) to (the room temperature+11° C.), and the deterioration of yarn quality, to be caused when the shaft portion 60c and roller body 60a were heated by the heat generated by the electric motor 6 for driving, was prevented.

Figure 12:
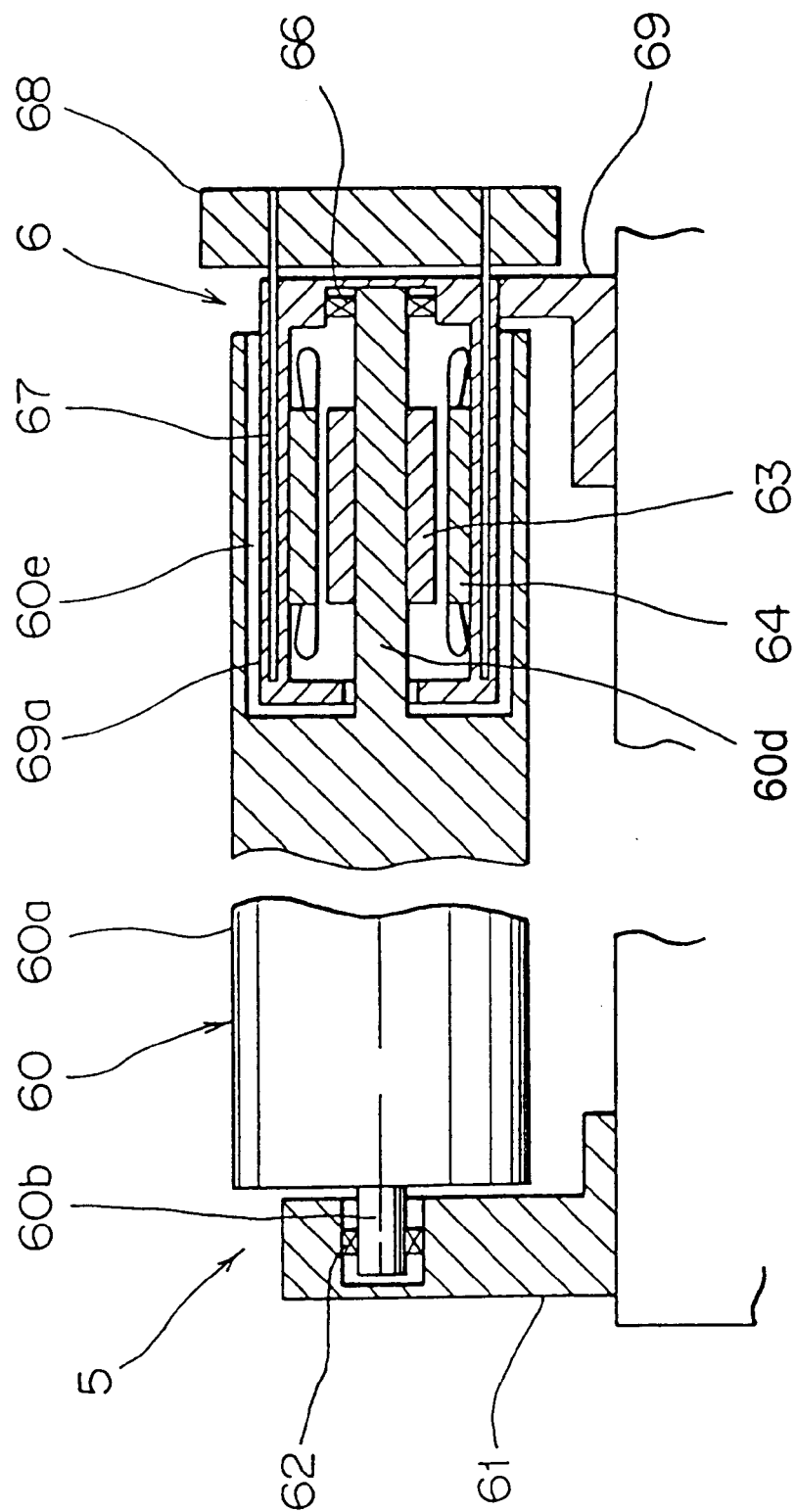
FIG. 12 is a sectional view showing an outline of the second example of the construction of the pressure roller of the winder of the present invention.

When one set of electric motor 6 for driving is installed in the end portion of the roller 60, as illustrated in FIG. 12, the shaft portion 60d is formed in such a manner that an annular gap portion 60e is provided at the end of the roller body 60a, and at the same time, the stator mounting portion 69a for the stator 64 of the housing 69 is formed into a cylindrical shape, so that the mounting portion 69a can be positioned in the annular gap portion 60e of the roller 60.

When the electric motor 6 for driving is disposed in the end portion of the roller 60 as described above, the length of the pressure roller 5 can be reduced in the axial direction.

Figure 13:
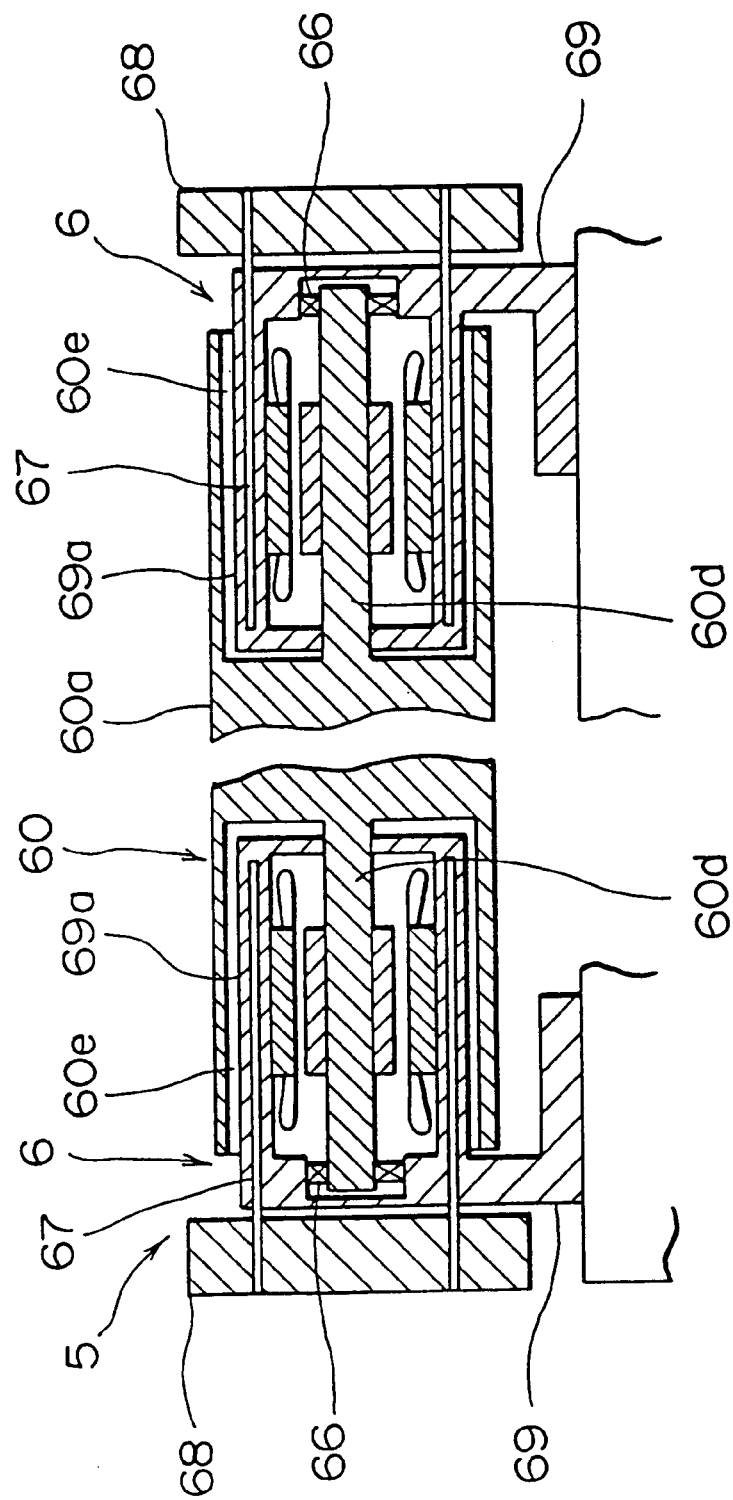
FIG. 13 is a sectional view showing an outline of the third example of the construction of the pressure roller of the winder of the present invention.

In the case where the electric motors 6 for driving are disposed at both end portions of the roller 60 wherein one electric motor is disposed at each end, as illustrated in FIG. 13, the shaft portion 60d is formed in such a manner that annular gap portions 60e are provided at both ends of the roller body 60a, and at the same time, in each end portion, the stator mounting portion 69a for the stator 64 of the housing 69 is formed into a cylindrical shape, so that the mounting portion 69a can be positioned in the annular gap portion 60e of the roller 60.

When the electric motors 6 for driving are disposed at both end portions of the roller 60, the size of the individual motors can be further reduced, and the diameter of the roller 60 can be reduced.

Figure 15:
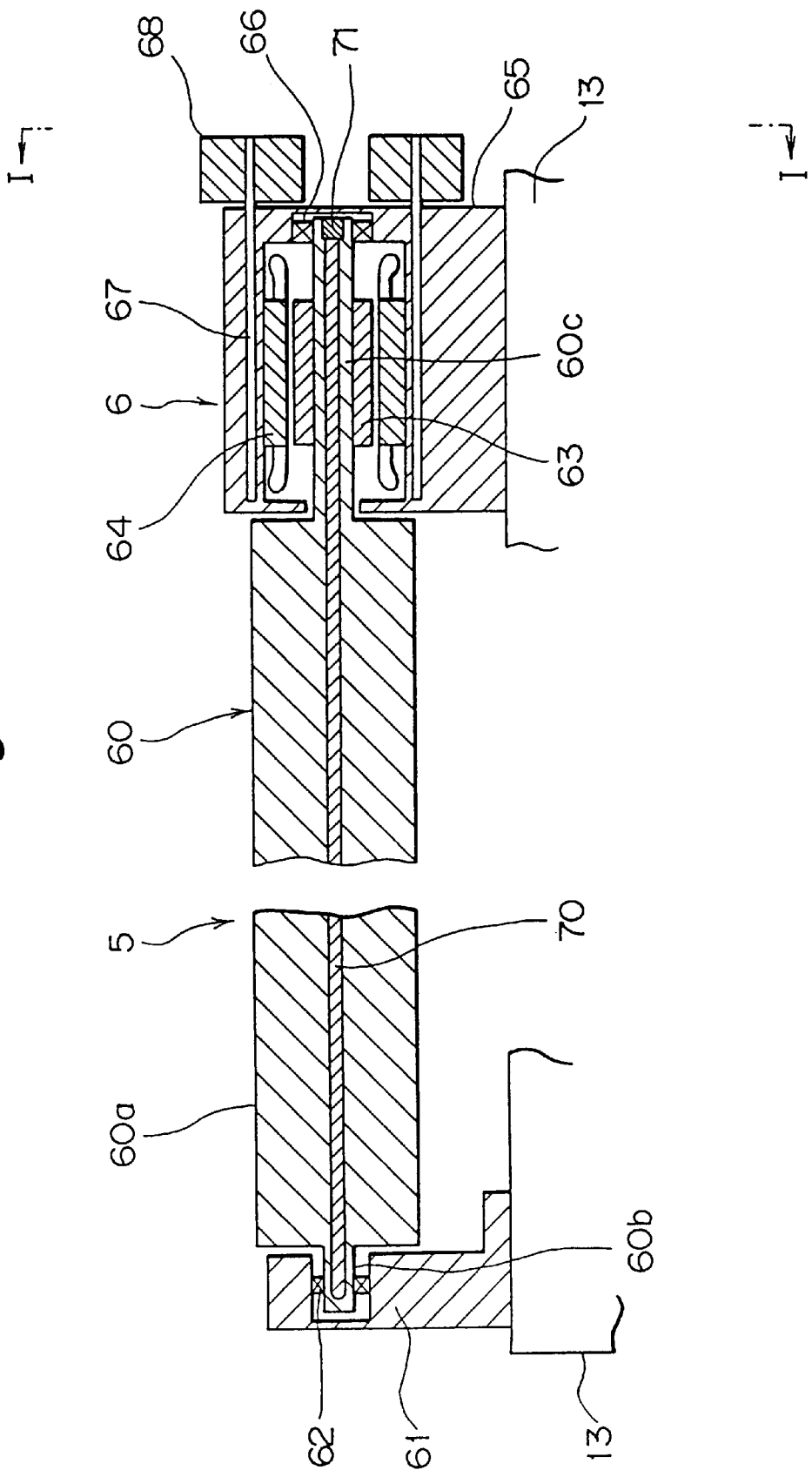
FIG. 15 is a sectional view showing an outline of the fourth example of the construction of the pressure roller of the winder of the present invention.

When the pressure roller 5 is of the drive roller type and a heat conductive member is provided in the roller, as illustrated in FIG. 15, the drive motor 6 for driving is integrally attached to the end portion of the roller 60. One shaft portion 60b of the roller 60 is rotatably supported by the frame body 13 through the bearing, and the other shaft portion 60c is extended and provided with the rotor 63. The end of the shaft portion 60c is rotatably supported by the housing 65 through the bearing 66, wherein the housing supports the stator 64 disposed in such a manner that the stator 64 covers the rotor 63.

A hole is formed in the axis portion of the roller 60, and a heat pipe 70 is inserted into the hole in such a manner that one end of the heat pipe 70 is positioned at the end of the roller body 60a or the bearing portion 60 of the shaft portion 60b, and the other end of the heat pipe 70 is positioned at the bearing portion 66 of the shaft portion 60c. In order to prevent the movement of the heat pipe 70, a blank cap 71 is screwed to the end portion of the shaft 60c.

The above housing 65 is of the integrated type or the split type. The housing 65 is mounted on the frame body 13 of the traverse unit 4, and a plurality of heat pipes 67 are inserted into the housing 65 in the outer circumferential direction in the same manner as that shown in FIG. 11. Fins 68 are mounted at the protruding portions of the heat pipes 67.

It is possible to employ the construction in which the shaft portion 60c of the roller 60 is extended and connected with the output shaft of an induction motor available in the market, wherein the rotor 63 for electric motor use is not attached to the shaft portion 60c. In this construction, a piece of heat conductive member is inserted into the axis portion of the rotational shaft of the induction motor in such a manner that the heat conductive member penetrates the axis portion. At the same time, it is also necessary to insert a heat conductive member into the housing portion for supporting the stator of the induction motor in such a manner that an end portion of the heat conductive member protrudes from the housing so as to attach a cooling member to the protruding portion.

In the drive type pressure roller 5 explained above, when the housing 65 is heated by the heat generated in the electric motor 66 section for driving, the generated heat is transmitted to the fins 68 at a low temperature through the heat pipes 67 inserted into the housing 65. Therefore, the heat is radiated from the surfaces of the fins 68, and at the same time the heat is also radiated from the peripheral surface of the housing 65.

On the other hand, when the shaft portion 60c of the roller 60 is heated, the generated heat is transmitted to the roller body 60a, the temperature of which is low, by the action of the heat pipe 60 inserted into the roller 60, and the transmitted heat is radiated from the entire circumferential surface of the roller body 60a.

As described above, the heat in the housing 65 is transmitted to the fins 68 through the heat pipes 67 and radiated, and at the same time, the heat of the shaft portion 60c is transmitted to the roller body 60a by the action of the heat pipe 70, and the transmitted heat is radiated from the entire circumferential surface. Accordingly, the temperature of the bearing 66 of the electric motor 6 for driving is not abnormally raised, so that the lubricant in the bearing is not deteriorated, and it possible to prevent the life of the bearing from being reduced. When the operation was carried out under the condition that the yarn winding speed was set at 5000 m/min, the increase in temperature of the bearing portion was reduced by about 20° C. While the bearing of the conventional pressure roller mechanism was replaced when it was operated for about 10000 hours, the bearing of the pressure roller mechanism of the present invention was replaced when it was operated for about 19000 hours which was approximately twice as long.

In the examples explained above, the shaft portion of the pressure roller is rotated. However, the present invention can be applied to an outer rotor type pressure roller in which the shaft is fixed to the housing.

Figure 16:
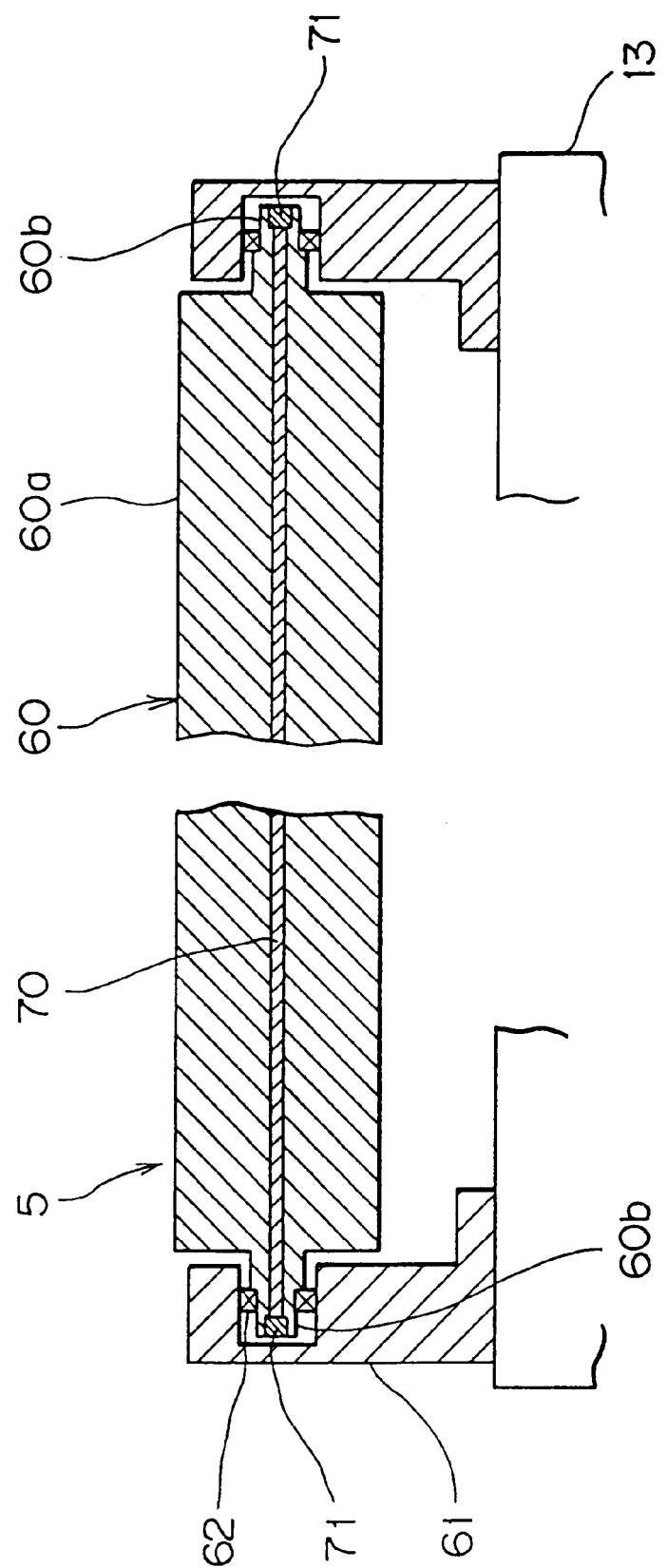
FIG. 16 is a sectional view showing an outline of the fifth example of the construction of the pressure roller of the winder of the present invention.
Figure 17:
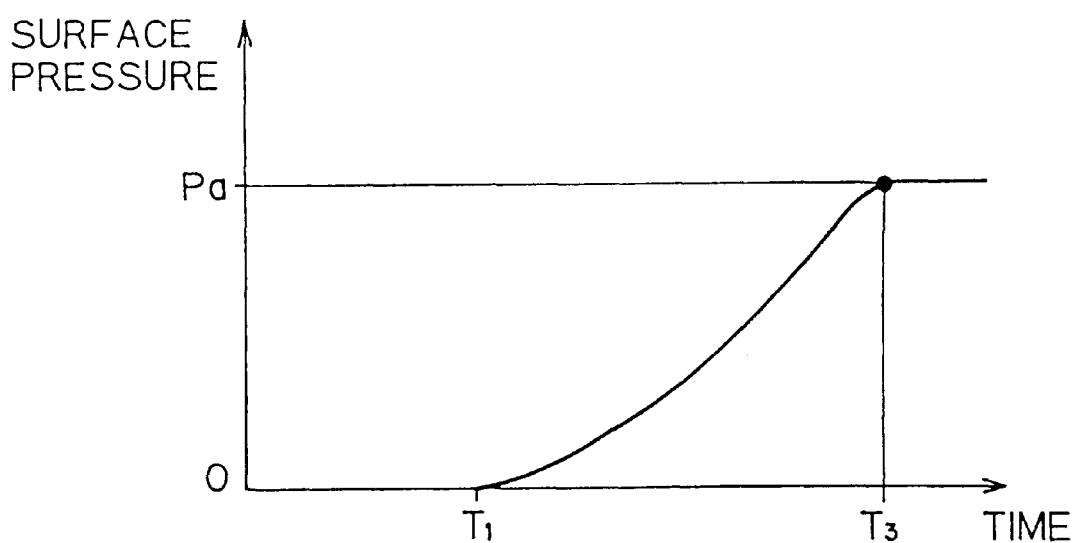
FIG. 17 is a schematic illustration showing a condition of surface pressure in the case where the pressure roller is contacted with a yarn layer on the tube of the conventional winder.

In the case where the pressure roller 5 is an idle type roller rotated by a package and a heat conductive member is inserted into the pressure roller 5, as illustrated in FIG. 16, the pressure roller 5 includes: a roller 60, the shaft portions 60b of which are protruded from both sides of the roller body 60a; a heat pipe 70 inserted into a hole formed in the axial portion of the roller 60; blank caps 71 screwed to the end portion of the heat pipe 70; and bearings for supporting both shaft portions 60b of the roller 60.

Instead of the heat pipe described above, a heat conductive member made of copper alloy having a high thermal conductivity may be used.

The aforementioned bearing is composed of a bearing 62 rotatably supporting the bearing portion 60b of the roller 60, and a bracket 61 supporting the bearing 62.

When the roller 60 is rotated by a tube tightly provided around the spindle 2 or rotated by a package, the bearing 62 is heated, so that the bracket 61 coming into contact with the outer race portion of the bearing 62 is also heated. Then the bearing 62 is cooled when the generated heat is radiated from the peripheral surface of the bracket 61.

On the other hand, the shaft portion 60b of the roller 60 coming into contact with the inner race portion of the bearing 62 is heated, the heat is transmitted to the roller body 60a side of low temperature, and the heat is radiated from the entire surface of the roller body 60a, so that the bearing 62 is cooled.

In the above roller 60, the generated heat of the shaft portion 60b is transmitted to the entire roller body 60a. Therefore, the radiation efficiency is greatly improved. As a result, the temperature of the bearing 62 is not increased, and the deterioration of lubricant can be avoided, so that the deterioration of bearing life can be prevented. When the yarn winding operation was conducted under the condition that the yarn winding speed was set at 5000 m/min, the increase in bearing temperature was reduced by not less than 20° C. Therefore, the bearing life was increased to 20000 hours which was approximately 1.5 times as long as the bearing life 13000 hours of the conventional pressure roller.

Even when the bearing portion 60b of the roller 60 was heated by the heat generated in the bearing 62 and the temperature of the bearing portion 60b was raised, the generated heat was immediately transmitted by the heat pipe 70 to a portion of low temperature. Accordingly, not only the temperature of the end portion of the roller body 60a close to the shaft portion 60b but also the temperature of the entire roller body 60a was made to be approximately uniform. In the conventional pressure roller, a temperature difference between the end and center of a yarn contact portion was approximately 5 to 10° C., however, it was maintained to be not more than 1° C. all over the yarn contact portion in this example.

In the above example, the heat pipe 70, which was a heat conductive member, was inserted into the roller 60 all over its length, however, the approximately same effect can be provided when a heat pipe is inserted, the length of which covers the bearing and the heat generating portion of the electric motor for driving.

The sequential operations of the controlling method for controlling a turret type yarn winder which is one of embodiments of the present invention, will be explained with reference to FIGS. 22 to 25, hereunder.

After starting, at the step 1, power and compressed air are supplied to this controlling system and the system is started.

In step 2, yarn-winding conditions suitable for a specific yarn used to be wound on a tube is predeterminedly set.

Thereafter, in step 3, a first switch S1 is turned ON to thereby generate a command for starting the yarn winding operation and in step 4, the hydraulic fluid cylinder 35 is actuated and thus in step 5, the stopper member 33 is raised to move to a waiting position.

Then, in step 6, a switching operation is carried out to introduce compressed air into the hydraulic fluid cylinder 22 and 23 and in step 7, the frame body 13 is descended.

In step 8, another hydraulic fluid cylinder 18 is actuated simultaneously with the descending of the frame body 13, so that a piston thereof is projected and thus in step 9, the descending distance of the frame body 13 is limited and therefore, a predetermined distance L can be created between the pressure roller 5 and the empty tube 100.

Thereafter, in step 10, a second switch S2 is turned ON and therefore, in step 11, motors for driving the spindle 2, the traverse unit 4 and the pressure roller 5 are actuated to thereby rotate the spindle 2, the traverse unit 4 and the pressure roller 5 respectively, in accordance with the yarn-winding condition which is set in step 2.

In step 12, it is determined whether or not the acceleration of the motors is completed, and if the answer is NO, then go back to the starting point of this step 12 and the same operation will be repeated, on the other hand, if the answer is YES, then go to step 13, and the calculation for determining the slippage of the pressure roller, will be carried out.

Then, in step 14, the rotation of the pressure roller 5 is adjusted utilizing the slippage information, and in step 15, the preparations for introducing the yarn into the yarn winder and for yarn taking operation, are carried out.

Thereafter, in step 16, a third switch S3 is turned ON, and in step 17, the yarn taking up operation is started and in step 18, the yarn-winding operation is started.

Next, in step 19, the calculation for determining a diameter of the yarn layer 220 formed on the tube 100 is carried out.

The calculation for determining a diameter D of the yarn layer is carried out utilizing a conventional method and, for example, it may carried out by utilizing the following calculation formula:

$$D = \sqrt{\frac{\pi \times St \times \rho}{4 \times T \times Tp} + D_0^2}$$

where, D denotes a diameter (cm) of the yarn layer:

$D_0$ denotes an external diameter of a tube (cm):

St denotes yarn winding width on the tube (cm) (transverse to a stroke direction):

$\rho$ denotes a yarn concentration on the tube (gcm$^3$):

T denotes yarn winding period (min) (elapsed time from the starting time for yarn winding operation):

Tp denotes an output value of the yarn output from a yarn supplying means (g/min) (through put value):

Then, in step 20, the rotation of the spindle is obtained by calculation. The calculation to obtain the rotation speed of the spindle Vsp can be carried out by utilizing a conventional method or utilizing the following calculation formula:

$$Vsp = \frac{V}{\pi \times D}$$

where, Vsp denotes the rotation speed of the spindle:

V denotes the yarn winding speed (m/min): and

D1 denotes a diameter (cm) of the yarn layer:

Thereafter, in step 21, the adjustment operation is carried out in which the rotation speed of the spindle is adjusted with respect to the slippage information, and in step 22, the current diameter of the yarn layer is compared with the predeterminedly set value for the diameter to determine whether or not the current diameter thereof exceeds the predeterminedly set value.

If the answer is NO, then go to step 19, and all of the above-mentioned steps are repeated, while if the answer is YES, then go to step 23.

In step 23, the hydraulic fluid cylinder 18 is actuated to have the piston thereof, holding the frame body 13 at a predetermined position, withdrawn.

Therefore, in step 24, the pressure roller 5 can bring into contact with a surface of thin layered yarns 220 wound on the surface of the tube 100.

In the present invention, above-mentioned steps 19 to 24 are called as feed-forward control.

Thereafter, in step 25, the rotation number of the pressure roller 5 is detected an in step 26, the adjustment for the rotation of the spindle is carried out.

Then, in step 27 it is determined whether or not a yarn switching switch S4 is turned ON, and if the answer is NO, then in step 28, the current winding time is compared with a predeterminedly set yarn winding time and it is determined whether or not the current yarn winding time exceeds the predeterminedly set value. And if the answer is YES, then go back to step 25, and all of the above-mentioned operations are repeated and if the answer is NO, then go to step 29. In step 29, it is determined whether or not the yarn winding operation is completed and if the answer is YES, then go to END to stop the yarn-winding operation, but if the answer is NO, then go to step 30 to start the rotation of the waiting spindle.

On the other hand, in step 27, the answer is YES, then go to step 30 by skipping the steps 27 and 28.

Then, in step 31, it is determined whether or not the acceleration of the motor for rotate the spindle is completed, and if the answer is NO, then go to the operation of this step 31 is repeated while the answer is YES, then go to step 32 and yarn switching operation is carried out.

In the step 32, the rotating speed of the pressure roller 5 in the yarn switching operation, is preferably increased in accordance with the rotational speed of the fully loaded tube before the yarn switching operation is completed.

On the other hand, the rotating speed of the pressure roller 5 is preferably switched up to a period when the yarn switching operation is completed, so that the rotating speed of the pressure roller 5 is approximately identical to the empty tube which should be changed for next yarn winding operation.

Thereafter, in step 33, the slippage of the pressure roller 5 is calculated and in step 34, the rotating speed of the pressure roller 5 is adjusted with respect to the slippage information.

Then, the winding tube switching operation is carried out and go back to step 19 and all of the above-mentioned operation indicated in the following steps are sequentially repeated.

As described in the first aspect of the present invention, the present invention is to provide a method for controlling the drive of a yarn winder in which a yarn is wound by a spindle drive type winder having a positively driven pressure roller, the method comprising the steps of: positioning the pressure roller so that the pressure roller is not contacted with a tube immediately after the yarn switching operation when the yarn is switched from the fully loaded tube to the empty tube; moving at least one of the pressure roller and the tube in a direction so that a distance between the pressure roller and the tube is reduced after a predetermined amount of yarn layer has been formed on the tube; permitting the pressure roller to come into contact with the yarn layer provided on the tube at a predetermined surface pressure; controlling the surface speed of the pressure roller to be higher than that of the empty tube until the yarn is switched to the empty tube side, wherein the controlled speed is approximately the same as or lower than the surface speed of the fully loaded tube; and controlling the surface speed of the pressure roller to be approximately the same as the surface speed of the empty tube after the yarn has been switched to the empty tube. Accordingly, in the yarn switching operation, an unnecessary tension fluctuation is not caused, and the yarn can be stably switched. When the speed of the pressure roller is switched at least before the yarn starts traversing, a package, the characteristics of which are uniform from the most inner layer to the most outer layer, can be provided.

As described in the second aspect of the present invention, the present invention is to provide a method for controlling the drive of a yarn winder in which a yarn is wound by a spindle drive type winder having a positively driven pressure roller, the method comprising the steps of: positioning the pressure roller so that the pressure roller is not contacted with a tube immediately after the yarn setting operation or the yarn switching operation; moving at least one of the pressure roller and the tube in a direction so that a distance between the pressure roller and the tube is reduced after a predetermined amount of yarn layer has been formed on the tube; permitting the pressure roller to come into contact with the yarn layer provided on the tube at a predetermined surface pressure; and switching the rotational speed control of the spindle from feed forward control based on the calculation of winding diameter, to feedback control by which the rotational speed of the spindle is controlled to a predetermined winding speed based on the rotational speed of the pressure roller when the pressure roller comes into contact with the yarn layer formed on the tube. Therefore, the rotational speed control of the spindle can be switched under the condition that the pressure roller comes into contact with a yarn layer on the tube with a predetermined surface pressure. Consequently, switching time of the rotational control of the spindle can be made to be constant, and accurate speed control can be carried out.

As described in the third aspect of the present invention, the present invention is to provide a method for controlling the drive of the pressure roller of a yarn winder in which a yarn is wound by a spindle drive type winder having an electric motor for driving the pressure roller, comprising the steps of: rotating the pressure roller by the electric motor at the yarn setting operation or the yarn switching operation under the condition that the pressure roller is not contacted with a tube tightly attached to the spindle; calculating a slippage caused in the electric motor; and correcting a command frequency given to the electric motor so as to command the rotation of the electric motor in accordance with the slippage. Accordingly, even after the winder, electric motor and bearing have been replaced, the slippage can be automatically calculated and renewed in the yarn setting operation in which the yarn winding starts, or in the yarn switching operation. After the calculation, the yarn winding operation can be carried out under a predetermined condition, so that a package of uniform configuration can be provided.

Also, the occurrence of heat generation and damage of the electric motor caused by overload can be prevented. Further, measurement of slippage of the electric motor for driving the pressure roller can be omitted at the time of completion of assembling the winder and also at the time of completion of replacing the bearing.

Also, according to the fourth aspect of the present invention, the present invention is to provide a method for controlling the drive of the pressure roller of a yarn winder, further comprising the step of calculating the slippage caused in the electric motor for driving the pressure roller by the number of pressure roller rotation detecting pulses or the number of detected rotation when the pressure roller is rotated by the electric motor at a predetermined rotational speed, and also calculating by the number of pulses or the number of rotation found while the slippage of the electric motor is neglected. Alternatively, according to the fifth aspect thereof, the present invention is to provide a method for controlling the drive of the pressure roller of a yarn winder, further comprising the step of calculating the slippage caused in the electric motor for driving the pressure roller by a command frequency at the time when the pressure roller is rotated by the electric motor at a predetermined speed, and also calculated by a frequency found while the slippage is neglected. Therefore, it is not necessary to install a specific apparatus for measuring the slippage, and it is possible to find an accurate slippage using only the existing apparatus.

According to the sixth aspect thereof, the present invention is to provide a yarn winder comprising hydraulic cylinders provided at both end portions of the frame body, wherein both end portions of the frame body are supported by the two hydraulic cylinders. Therefore, the running resistance of the sliding ball bearing can be reduced, and the surface pressure control of the pressure roller can be accurately carried out. Since the sliding ball bearing is not given a high moment, a sliding ball bearing, the allowable moment of which is low, can be applied, so that the diameter and length of the sliding ball bearing can be reduced. As a result, the overall height of the winder can be lowered.

According to the seventh aspect thereof, it is possible to adopt the construction in which the inner diameters of the two hydraulic cylinders are different. When the above construction is adopted, the winder can be controlled so that vibration is not caused during the winding operation.

According to the eighth aspect thereof, the present invention is to provide a yarn winder, in which a hydraulic fluid supply pipe is connected to each hydraulic cylinder, and a control unit is provided and a pipe line of the hydraulic fluid supply pipe is changed or hydraulic pressure of the supplied fluid is controlled in accordance with a signal sent from the control unit. Therefore, when resonance is caused during the winding operation, the resonance is accurately detected, and hydraulic pressure of each hydraulic cylinder is changed so that a moment activated on the sliding ball bearing is changed. In this way, damping resistance force can be adjusted, and resonance can be quickly avoided.

According to ninth aspect thereof, the present invention is to provide a yarn winder, comprising a stopper means for fixing the frame body to the machine frame so that the pressure roller is not contacted with the tubes held by the spindle, the stopper means including a stopper member provided on the machine frame side and an engaging member provided in the frame body, wherein a contact surface of the stopper and engaging members is inclined by and angle of 0° to 45° so that a lower tangential line of the contact surface is inclined toward the cantilever supporting side of a movable frame body. Therefore, since the sliding ball bearing is not given a high moment when the frame body is held by the stopper means, a sliding ball bearing, the allowable moment of which is low, can be applied, so that the diameter and length of the sliding ball bearing can be reduced. As a result, the overall height of the winder can be lowered.

According to the tenth aspect thereof, the pressure roller of the yarn winder comprises an electric motor provided at one end portion of the pressure roller, wherein a shaft of the pressure roller and an output shaft of the electric motor are commonly used, and according to the eleventh aspect thereof, the pressure roller of the yarn winder comprises electric motors provided at both end portions of the pressure roller, wherein a shaft of the pressure roller and an output shaft of the electric motor are commonly used. Therefore, it is possible to make the pressure roller compact and light, and further it is possible to make the sizes of individual motors small.

According to twelfth aspect thereof, the present invention is to provide a pressure roller of the yarn winder comprising an electric motor provided at one end portion of the pressure roller, wherein a shaft of the pressure roller and an output shaft of the electric motor are commonly used, and a heat conductive member is inserted into a housing portion of the electric motor in such a manner that the heat conductive member is protruded onto the opposite side to the pressure roller and a cooling member is attached to the protruding portion of the heat conductive member. Therefore, the heat generated in the electric motor portion can be quickly radiated, and it is possible to prevent the bearing life from being reduced due to the heat generated in the electric motor portion. Further, it is possible to prevent the roller body from being heated so that a change in the characteristics of the yarn coming into contact with the roller body can be avoided.

According to other embodiment of the twelfth aspect thereof, the present invention is to provide a pressure roller of the yarn winder in which a heat conductive member is inserted into a core portion of the pressure roller in the longitudinal direction of the core including at least the housing portion of the electric motor. According to another embodiment of this aspect, the present invention is to provide a pressure roller of the yarn winder in which the pressure roller is rotatably attached to a supporting member through a bearing, and a heat conductive member is inserted into the pressure roller in the longitudinal direction of the core of the pressure roller including at least bearing portions provided at both ends. Therefore, the heat generated in the bearing portion can be transmitted by the heat conductive member to a portion of the roller, the temperature of which is low. Consequently, it is possible to prevent the bearing life from being shortened, and the occurrence of uneven temperature distribution on the roller can be eliminated.

We claim:

1. A winding machine for winding a yarn from a yarn supplying source, comprising:

a machine frame;

a spindle rotatably attached to the machine frame, said spindle supporting a plurality of tubes on which yarns are wound;

a pressure roller movable into contact with a yarn layer wound around the tubes supported by the spindle;

a traverse unit provided upstream, in terms of yarn travel to the tubes, from the pressure roller;

a frame body having opposite end portions and rotatably supporting the pressure roller, the frame body being slidably supported at one of said opposite end portions, for movement normal to a direction between the opposite end portions, by and cantilevered from the machine frame for advancement of the pressure roller toward and retraction thereof from the spindle; and at least two actuating cylinders, provided one at each of said opposite end portions of the frame body, for obtaining the movement of the frame body relative to the machine frame, said end portions of the frame body being located adjacent to opposite axial ends of the pressure roller, respectively.

2. A yarn winder according to claim 1, wherein the inner diameters of each one of said at least two actuating cylinders are different from each other.

3. A yarn winder according to claim 1, wherein each of said actuating cylinders are connected to a respective actuating fluid supply pipe, and including control means for controlling actuating fluid flowing through each said actuating fluid supply pipe, wherein pressure of said actuating fluid flowing through each of said actuating fluid supply pipes is adjusted with respect to a controlling signal output from said control means.

4. A yarn winder according to claim 3, wherein said actuating fluid pipe comprises a plurality of sub actuating fluid pipes, each of said sub actuating fluid pipes being connected to the respective actuating cylinder and supplying the actuating fluid under pressure different from that supplied by the other actuating cylinder, and wherein said control means selects one of said actuating fluid supply pipes and said actuating cylinder connected thereto and supplies actuating fluid under a predetermined pressure.

5. A yarn winder according to claim 1, including at least one pressure adjusting means for adjusting pressure of said actuating fluid and provided on said actuating fluid supply pipe connected to said actuating cylinder, and wherein said control means selectively controls said pressure adjusting means so that actuating fluid is supplied to said actuating cylinder under a predetermined pressure.

* * * * *